United States Patent
Saeki et al.

(10) Patent No.: US 10,000,094 B2
(45) Date of Patent: Jun. 19, 2018

(54) HEAVY DUTY PNEUMATIC TIRE

(71) Applicant: BRIDGESTONE CORPORATION, Chuo-ku, Tokyo (JP)

(72) Inventors: Kentaro Saeki, Tokorozawa (JP); Nobuyuki Yamamoto, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 9 days.

(21) Appl. No.: 14/914,325

(22) PCT Filed: Aug. 28, 2014

(86) PCT No.: PCT/JP2014/004436
§ 371 (c)(1),
(2) Date: Feb. 25, 2016

(87) PCT Pub. No.: WO2015/029442
PCT Pub. Date: Mar. 5, 2015

(65) Prior Publication Data
US 2016/0207360 A1 Jul. 21, 2016

(30) Foreign Application Priority Data
Aug. 28, 2013 (JP) .................................. 2013-177073

(51) Int. Cl.
*B60C 11/11* (2006.01)
*B60C 11/03* (2006.01)
*B60C 11/12* (2006.01)

(52) U.S. Cl.
CPC ...... *B60C 11/1236* (2013.01); *B60C 11/0327* (2013.01); *B60C 11/11* (2013.01);
(Continued)

(58) Field of Classification Search
CPC . B60C 11/03; B60C 11/0306; B60C 11/0327; B60C 11/033; B60C 11/0332;
(Continued)

(56) References Cited

U.S. PATENT DOCUMENTS

| 2015/0013865 A1* | 1/2015 | Yoshikawa | ......... B60C 11/1218 |
| | | | 152/209.18 |
| 2015/0183274 A1* | 7/2015 | Felder | ................. B60C 11/0306 |
| | | | 152/209.25 |

FOREIGN PATENT DOCUMENTS

| CA | 2000945 A1 | 4/1990 |
| CN | 1968832 A | 5/2007 |

(Continued)

OTHER PUBLICATIONS

Michelin North America, Inc., "Michelin X Multi Energy D Tire", 2012.

*Primary Examiner* — Eric Hug
(74) *Attorney, Agent, or Firm* — Kenja IP Law PC

(57) ABSTRACT

A heavy duty pneumatic tire includes a tread surface having, on at least a section thereof, a plurality of circumferential-direction grooves extending along a tread circumferential line and land portions defined either by the circumferential-direction grooves or by the circumferential-direction grooves and tread ground contact edges. The land portions include at least one partitioned land portion in which a plurality of narrow width-direction grooves extending in a tread width direction are provided. A prescribed internal pressure is at least 750 kPa. A depth of the circumferential-direction grooves, represented by H, satisfies a relationship $7\ mm \leq H \leq 13\ mm$. A tread circumferential-direction spacing of the narrow width-direction grooves, represented by W, satisfies a relationship $5\ mm \leq W \leq 20\ mm$.

7 Claims, 17 Drawing Sheets

(52) U.S. Cl.
CPC ....... *B60C 11/12* (2013.01); *B60C 2011/0334* (2013.01); *B60C 2011/0355* (2013.01); *B60C 2011/129* (2013.01); *B60C 2011/1209* (2013.01); *B60C 2011/1295* (2013.01); *B60C 2200/06* (2013.01)

(58) Field of Classification Search
CPC ..... B60C 2011/0334; B60C 2011/0355; B60C 11/04; B60C 11/11; B60C 11/12; B60C 11/1204; B60C 11/1218; B60C 2011/1209; B60C 11/1236; B60C 11/129; B60C 2011/1295; B60C 2200/06; B60C 2200/065
USPC ......... 152/209.1, 209.9, 209.18, 209.25, 902
See application file for complete search history.

(56) References Cited

FOREIGN PATENT DOCUMENTS

| | | | |
|---|---|---|---|
| CN | 102145638 | A | 8/2011 |
| CN | 102227324 | A | 10/2011 |
| CN | 102463853 | A | 5/2012 |
| EP | 0355656 | A2 | 2/1990 |
| EP | 1491366 | A1 | 12/2004 |
| JP | H02-158402 | A | 6/1990 |
| JP | H04-85112 | A | 3/1992 |
| JP | H05-330315 | A | 12/1993 |
| JP | H11-245631 | A | 9/1999 |
| JP | 2005-271792 | A | 10/2005 |
| JP | 2006103522 | A | 4/2006 |
| JP | 2007091197 | A | 4/2007 |
| JP | 2010006107 | A | 1/2010 |
| JP | 2010-125977 | A | 6/2010 |

\* cited by examiner

FIG. 4
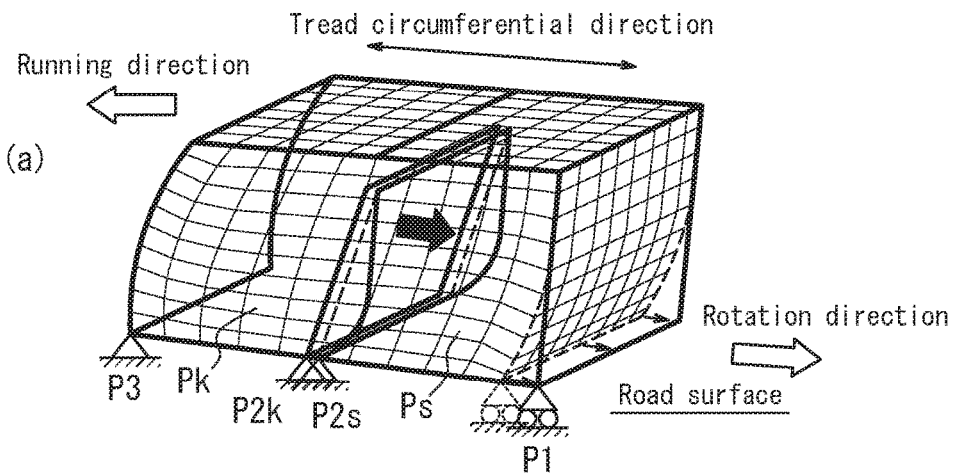
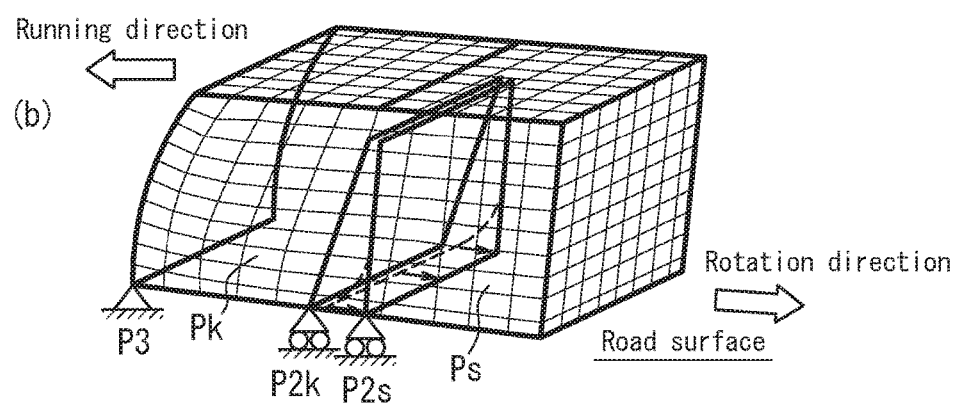
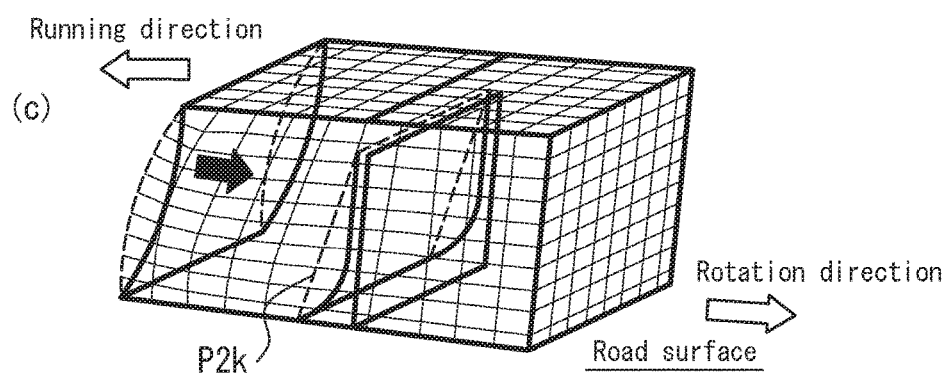

FIG. 7
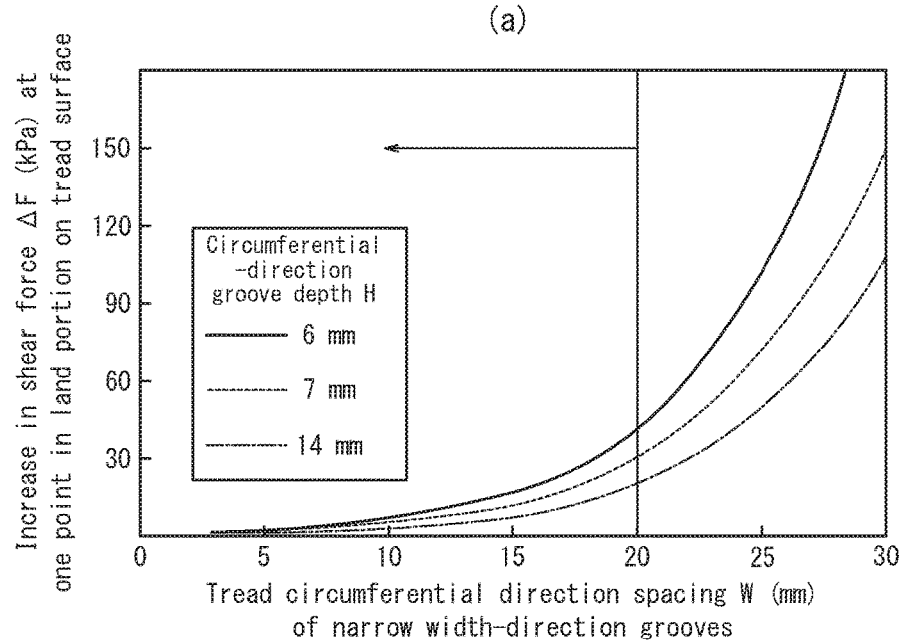
(a)
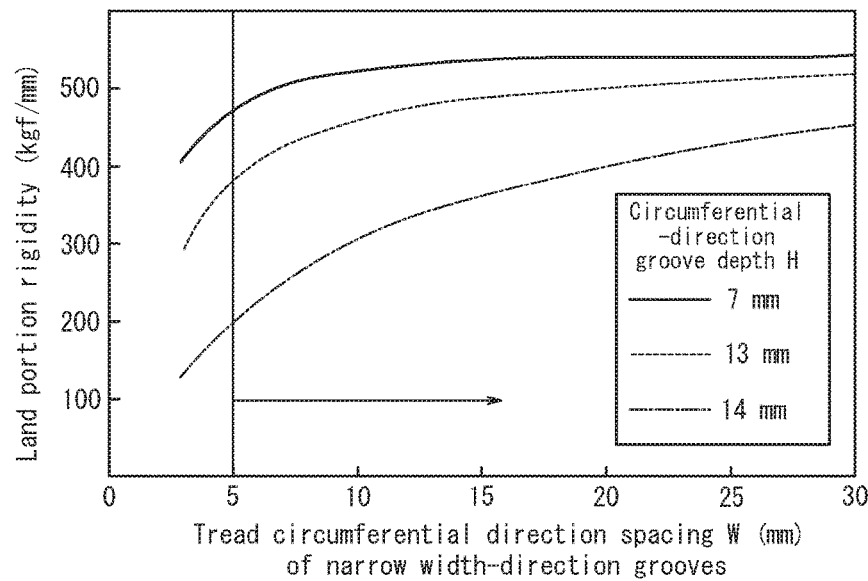
(b)

FIG. 8
(a)
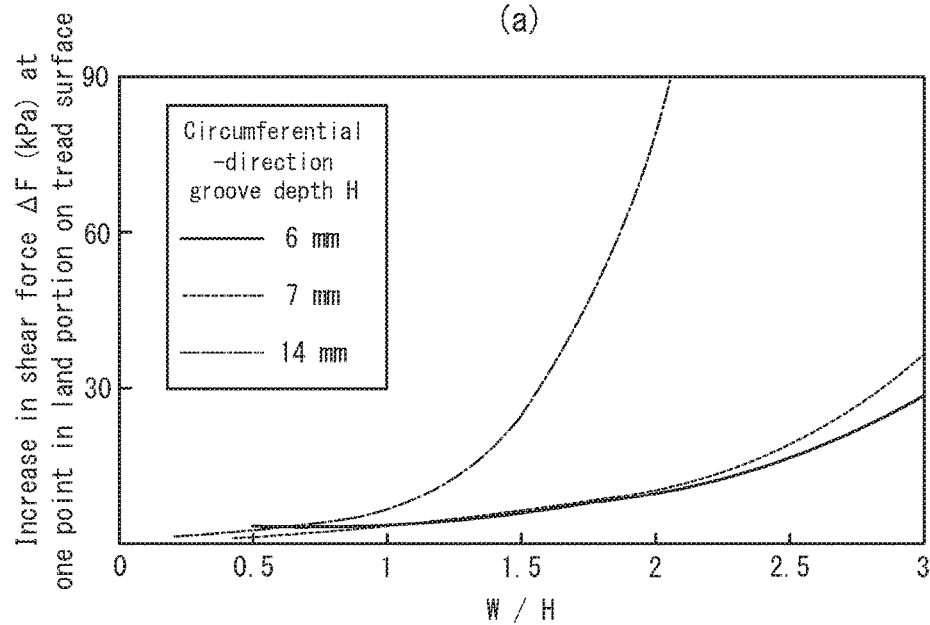
(b)
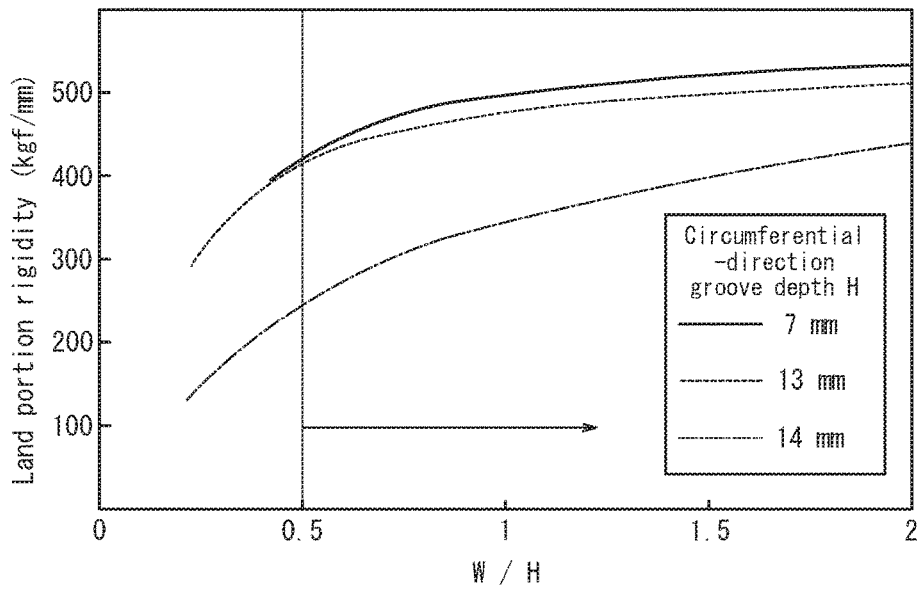

HEAVY DUTY PNEUMATIC TIRE

TECHNICAL FIELD

The present disclosure relates to a heavy duty pneumatic tire and, in particular, relates to a heavy duty pneumatic tire that achieves a favorable balance of wear resistance and traction performance.

BACKGROUND

Heavy duty pneumatic tires for use on trucks, buses, etc., are expected to have traction performance under various road surface conditions. In order to meet such expectations, a heavy duty pneumatic tire generally includes a tread surface on which land portion blocks or rib-shaped land portions are defined, for example, by circumferential-direction grooves that extend along a tread circumferential line and narrow width-direction grooves that extend in a tread width direction (refer to PTL 1 for example).

CITATION LIST

Patent Literature

PTL 1: JP2010-125977

SUMMARY

Technical Problem

However, land portions of heavy duty pneumatic tires tend to be susceptible to wear because heavy duty pneumatic tires are subjected to heavier loads than pneumatic tires for ordinary vehicles such as passenger cars. Therefore, conventional heavy duty pneumatic tires such as described above have struggled to achieve a favorable balance of wear resistance and traction performance.

In view of the above problem, the present disclosure aims to provide a heavy duty pneumatic tire that enables a favorable balance of wear resistance and traction performance.

Solution to Problem

The inventors conducted diligent research into the mechanism by which wear occurs to land portions on a tread surface of a heavy duty pneumatic tire with an aim of achieving a favorable balance of wear resistance and traction performance, and arrived at the following findings.

FIG. 1 illustrates land portions on a tread surface of a heavy duty pneumatic tire and also illustrates a small part of one of the land portions. FIGS. 2a to 2c illustrate a change in shape of the small part of the land portion during loaded rolling.

During loaded rolling of the tire, first, when there is braking or driving of the tire as illustrated in FIG. 2a, the entire land portion receives shear force in a tread circumferential direction that is the same as a running direction and undergoes shear deformation. Subsequently, slipping (indicated by small arrows in FIG. 2a; same below) occurs at a position (indicated by P1 in FIG. 2a) at a stepping-in side of the land portion to release the shear deformation, and expansion (indicated by large arrows in FIG. 2a; same below) occurs in an opposite direction to the running direction at a position (indicated by P2 in FIG. 2a) further toward a kicking-out side of the land portion than the position P1 and at a position (indicated by P3 in FIG. 2a) further toward the kicking-out side of the land portion than the position P2. Next, as illustrated in FIG. 2b, slipping occurs at the expanded position P2 and expansion occurs in the opposite direction to the running direction at the land portion position P3, which is further toward the kicking-out side of the land portion than the position P2. Repeated slipping and expansion such as described above leads to a substantial increase in shear deformation at the land portion position P3. When slipping occurs at the land portion position P3 to release the shear deformation as illustrated in FIG. 2c, a section of the land portion at the position P3 is worn due to receiving a large frictional force from the road surface in a tread circumferential direction that is the same as the running direction.

FIG. 3 illustrates a relationship between time and an increase in tread circumferential-direction shear force $\Delta F$ from a stepping-in time to a kicking-out time at an arbitrary point in a land portion on the tread surface illustrated in FIG. 1. As explained above, during a time frame in which the point is in ground contact, tread circumferential-direction shear force increases substantially at the kicking-out time, compared to at the stepping-in time, and frictional force received from the road surface at the point increases.

Furthermore, the inventors realized that the substantial increase in frictional force tends to lead to higher tire wear and lower tire wear resistance.

The above tendency is particularly noticeable in heavy duty pneumatic tires for trucks, buses, etc., in which tread rubber is subjected to a relatively heavy load.

The inventors attempted to suppress the repeated slipping and expansion described above by finely partitioning the land portions in the tread circumferential direction through tread width-direction grooves or tread width-direction sipes provided in the land portions.

FIG. 4 illustrates a land portion that is finely partitioned in the tread circumferential direction (partitioned into a land portion section Ps on a stepping-in side and a land portion section Pk on a kicking-out side in FIG. 4) by providing grooves or sipes in a direction along line X-X' illustrated in FIG. 2.

As illustrated in FIG. 4a, slipping that occurs at a land portion position P1 included in the land portion section Ps is transmitted to a land portion position P2s also included in the land portion section Ps and expansion occurs at the land portion position P2s in the opposite direction to the running direction. However, as illustrated in FIG. 4b, the slipping is not transmitted to a land portion position P2k included in the land portion section Pk and, as a result, expansion does not occur in the land portion section including the land portion position P2k. Also, as illustrated in FIG. 4c, the land portion section including the land portion position P2k receives shear force from the road surface in a tread circumferential direction that is the same as the running direction and undergoes new shear deformation. Therefore, unlike the case illustrated in FIG. 2, repeated slipping and expansion in the land portion is cut off and the substantial increase in tread circumferential-direction frictional force that occurs at the kicking-out time is suppressed.

FIG. 5 illustrates a relationship between time and an increase in tread circumferential-direction shear force $\Delta F$ from a stepping-in time to a kicking-out time at an arbitrary point in the land portion on the tread surface illustrated in FIG. 4. It should be recognized that the above-described tread circumferential-direction shear force at the kicking-out time and the substantial increase in frictional force are suppressed.

Consequently, it was possible to suppress reduction in tire wear resistance through provision of the tread width direction grooves or the tread width direction sipes.

However, in the configuration described above, partitioning of the land portion into land portion sections through provision of grooves or sipes is problematic because such partitioning reduces rigidity of the entire land portion and traction performance of the tire.

In light of the above problem, the inventors conceived the idea of achieving a favorable balance of tire wear resistance and traction performance by appropriately adjusting land portion partitioning and rigidity of land portion sections created by such partitioning, which lead to the present disclosure.

Specifically, the present disclosure can be summarized as follows.

A heavy duty pneumatic tire of the present disclosure includes a tread surface having, on at least a section thereof, a plurality of circumferential-direction grooves extending along a tread circumferential line and land portions defined either by the circumferential-direction grooves or by the circumferential-direction grooves and tread ground contact edges. The land portions include at least one partitioned land portion in which a plurality of narrow width-direction grooves extending in a tread width direction are provided. A prescribed internal pressure is at least 750 kPa. A depth of the circumferential-direction grooves, represented by H, satisfies a relationship 7 mm≤H≤13 mm. A tread circumferential-direction spacing of the narrow width-direction grooves, represented by W, satisfies a relationship 5 mm≤W≤20 mm.

By providing narrow width-direction grooves in a land portion to further define land portion sections in the land portion as described above, the above-described repeated slipping and expansion in the land portion can be cut off and the above-described increase in tread circumferential-direction shear force that occurs at the kicking-out time can be suppressed. Consequently, tire wear resistance can be improved.

Furthermore, as a result of the depth H of the circumferential-direction grooves that define the land portions being smaller than 18 mm, which is the depth for a normal heavy duty pneumatic tire, a reduction in land portion rigidity that occurs as a consequence of providing the narrow width-direction grooves in the land portion and a reduction in traction performance can be suppressed. Herein, tire wear resistance can be improved while also suppressing reduction in traction performance by setting the depth H described above as at least 7 mm and no greater than 13 mm. Furthermore, reduction in traction performance can be suppressed while also improving tire wear resistance by setting the tread circumferential-direction spacing W of the narrow width-direction grooves provided in the land portion as at least 5 mm and no greater than 20 mm.

Consequently, the heavy duty pneumatic tire of the present disclosure enables a favorable balance of wear resistance and traction performance.

It should be noted that "extending along a tread circumferential line" is not intended as a limitation to extension in a straight line shape in the tread circumferential direction and may refer to extension in another shape, such as a zigzag-shape or a wavy-shape, in the tread circumferential direction.

Also note that "extending in a tread width direction" does not necessarily refer to extension in the tread width direction in a strict sense and may refer to extension in a direction that has a tread width-direction component.

Furthermore, "prescribed internal pressure" refers to an air pressure (maximum air pressure) corresponding to a stipulated load for a tire of an applicable size, and "stipulated load" refers to a maximum tire load stipulated by valid industrial standards for a region in which the tire is manufactured and used, such as the Japan Automobile Tyre Manufacturers Association (JATMA) Year Book in Japan, the European Tyre and Rim Technical Organization (ETRTO) Standards Manual in Europe, or The Tire and Rim Association Inc. (TRA) Year Book in the United States of America.

Also note that "depth H of the circumferential-direction grooves" refers to a greatest depth of the circumferential-direction grooves in the tire radial direction. Furthermore, "tread circumferential-direction spacing W of the narrow width-direction grooves" refers to a narrowest tread circumferential-direction spacing of two narrow width-direction grooves.

In the heavy duty pneumatic tire of the present disclosure, the tread circumferential-direction spacing of the narrow width-direction grooves and the depth of the circumferential-direction grooves preferably satisfy a relationship 0.5≤W/H≤2.0. As a result of W/H being in the range described above, a balance of high levels of wear resistance and traction performance can be achieved.

In the heavy duty pneumatic tire of the present disclosure, a tread width-direction length of the narrow width-direction grooves, represented by m, and a tread width-direction width of the land portion in which the narrow width-direction grooves are provided, represented by M, preferably satisfy a relationship m≥0.5M. As a result of m being at least 0.5M, reduction in tire traction performance can be further suppressed while improving wear resistance.

It should be noted that the "tread width-direction length m of the narrow width-direction grooves" and the "tread width-direction width M of the land portion" are defined for each of the narrow width-direction grooves. Herein, m refers to a tread width-direction distance between one end of the narrow width-direction groove and the other end of the narrow width-direction groove, and M refers to a tread width-direction distance along a straight line parallel to the tread width direction that passes through a central point of a line that extends along the narrow width-direction groove from the one end of the narrow width-direction groove to the other end of the narrow width-direction groove.

In the heavy duty pneumatic tire of the present disclosure, the narrow width-direction grooves preferably each extend in a bent shape in a tire radial direction. The configuration described above enables further suppression of reduction in tire traction performance.

In the heavy duty pneumatic tire of the present disclosure, the land portions preferably include a first partitioned land portion and a second partitioned land portion located outward in the tread width direction relative to the first partitioned land portion, and a tread circumferential-direction spacing of narrow width-direction grooves in the second partitioned land portion is preferably greater than a tread circumferential-direction spacing of narrow width-direction grooves in the first partitioned land portion. The configuration described above enables extended tire life while also enabling a favorable balance of tire wear resistance and tire traction performance.

In the heavy duty pneumatic tire of the present disclosure, the land portions preferably further include at least one other partitioned land portion in addition to the first partitioned land portion and the second partitioned land portion, and among partitioned land portions that are adjacent in the tread width direction, a tread circumferential-direction spacing of narrow width-direction grooves in a partitioned land portion located further outward in the tread width direction is preferably greater than a tread circumferential-direction spacing of narrow width-direction grooves in a partitioned land portion located closer to a tire equator. The configuration described above enables extended tire life while also enabling a favorable balance of tire wear resistance and tire traction performance.

In the heavy duty pneumatic tire of the present disclosure, the first partitioned land portion is preferably provided over a range of from 0% to 40% of a tread ground contact half-width from the tire equator as a center. An effect of improvement in tire wear resistance can be efficiently obtained by adopting the configuration described above.

Advantageous Effect

The heavy duty pneumatic tire of the present disclosure enables a favorable balance of tire wear resistance and tire traction performance.

BRIEF DESCRIPTION OF THE DRAWINGS

In the accompanying drawings:

FIG. 4a to 4c illustrate a change in shape of a small part of a land portion partitioned in a tread circumferential direction during loaded rolling;

FIG. 7a illustrates, for various circumferential-direction groove depths H, a relationship between a tread circumferential-direction spacing W of narrow width-direction grooves and an increase in tread circumferential-direction shear force ΔF at a kicking-out time; FIG. 7b illustrates, for various circumferential-direction groove depths H, a relationship between the tread circumferential-direction spacing W of the narrow width-direction grooves and land portion rigidity;

FIG. 8a illustrates, for various circumferential-direction groove depths H, a relationship between a ratio (W/H) of the tread circumferential-direction spacing W of narrow width-direction grooves relative to the circumferential-direction groove depth H and the increase in tread circumferential-direction shear force ΔF at the kicking-out time; FIG. 8b illustrates, for various circumferential-direction groove depths H, a relationship between the ratio (W/H) of the tread circumferential-direction spacing W of narrow width-direction grooves relative to the circumferential-direction groove depth H and land portion rigidity;

DETAILED DESCRIPTION

The following provides a detailed explanation of exemplary embodiments of a heavy duty pneumatic tire of the present disclosure with reference to the drawings.

Figure 6:
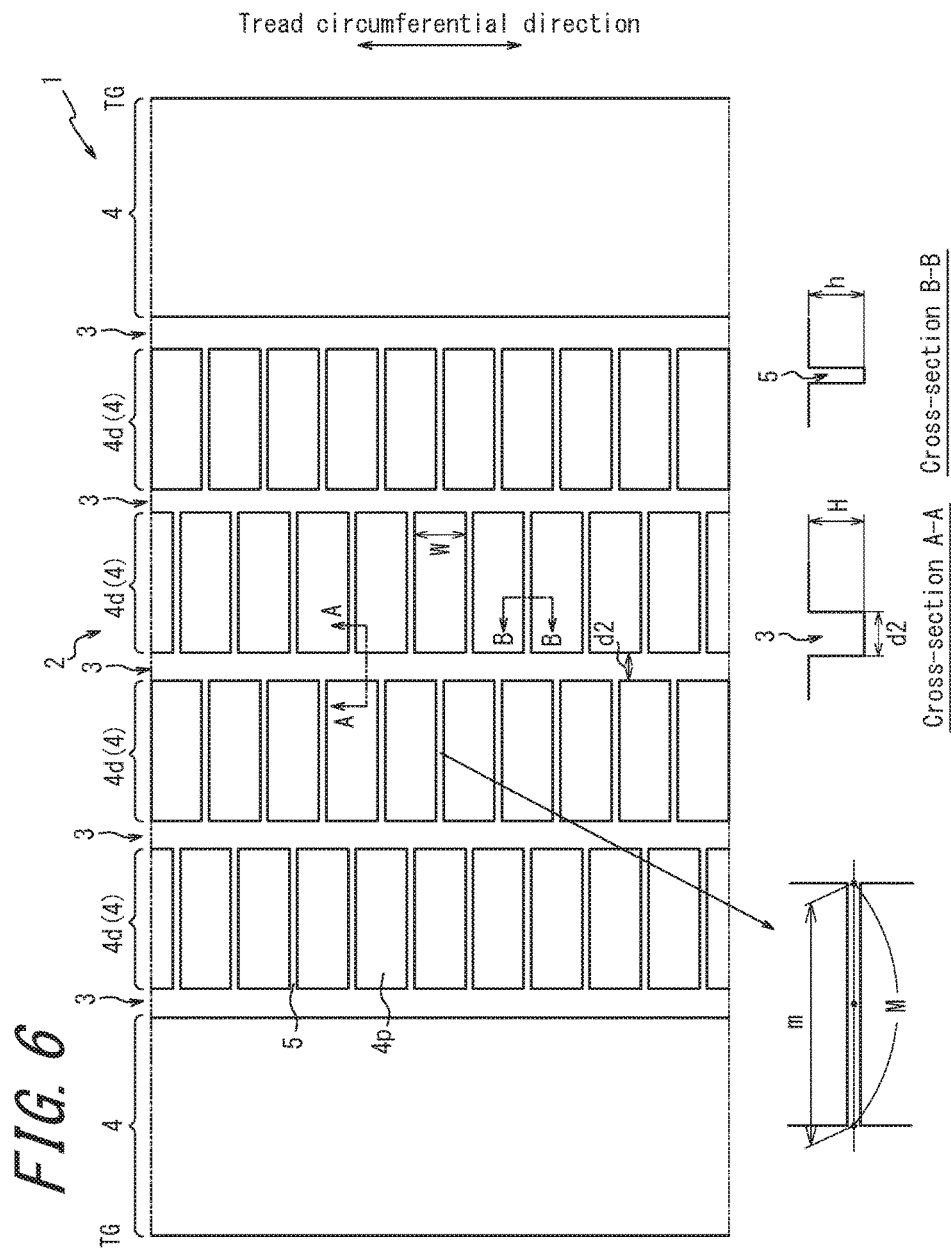
FIG. 6 is a developed view illustrating a tread surface of an exemplary heavy duty pneumatic tire of the present disclosure.

FIG. 6 is a developed view illustrating a tread surface of an exemplary heavy duty pneumatic tire of the present disclosure.

The exemplary heavy duty pneumatic tire 1 of the present disclosure (also referred to below as "exemplary heavy duty tire 1") includes a tire tread surface 2 having a plurality (five in FIG. 6) of circumferential-direction grooves 3 that extend along a tread circumferential line and land portions 4 that are defined either between the circumferential-direction grooves 3 or between the circumferential-direction grooves 3 and tread ground contact edges TG. The land portions 4 are partitioned land portions 4d in which a plurality (a large number in FIG. 6) of narrow width-direction grooves 5 extending in a tread width direction are provided such that land portion sections 4p are defined in the land portions 4 between the narrow width-direction grooves 5. The heavy duty pneumatic tire 1 is for example used with a prescribed internal pressure of at least 750 kPa.

It should be noted that so long as the above-described land portions are provided on at least a section of the tread surface of the heavy duty pneumatic tire of the present disclosure, it is not necessary for the above-described land portions to be provided over the entire tire tread surface. Also note that so long as the land portions provided in the heavy duty pneumatic tire of the present disclosure include at least one partitioned land portion, it is not necessary for all of the land portions to be partitioned land portions.

Figure 1:
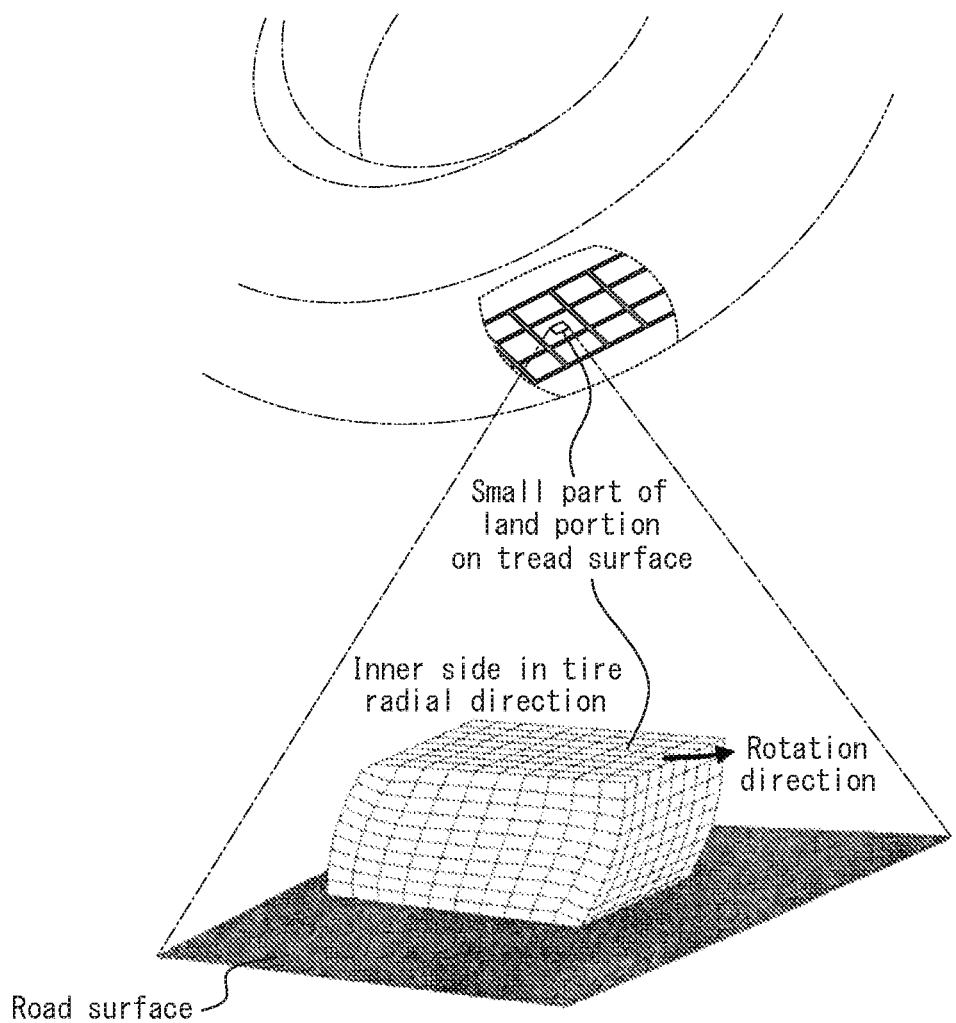
FIG. 1 illustrates land portions on a tread surface of a standard heavy duty pneumatic tire and a small part of one of the land portions.
Figure 2:
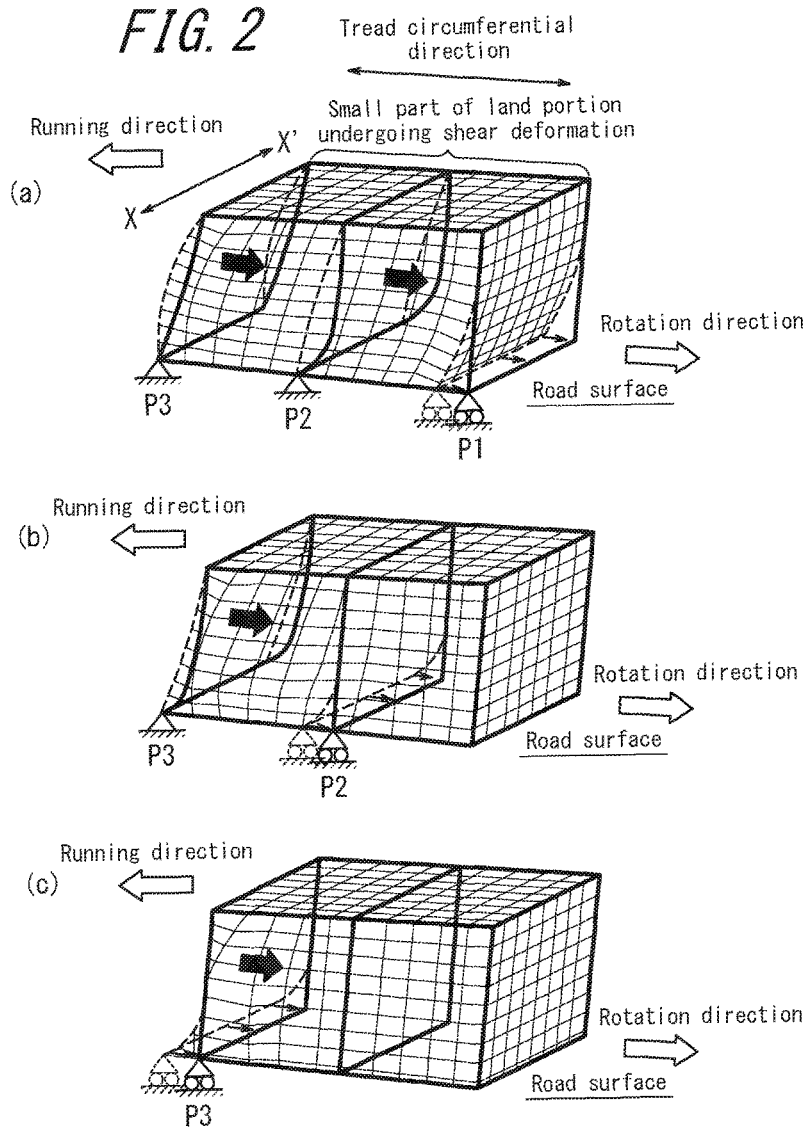
FIGS. 2a to 2c illustrate a change in shape of the small part illustrated in FIG. 1 during loaded rolling.
Figure 3:
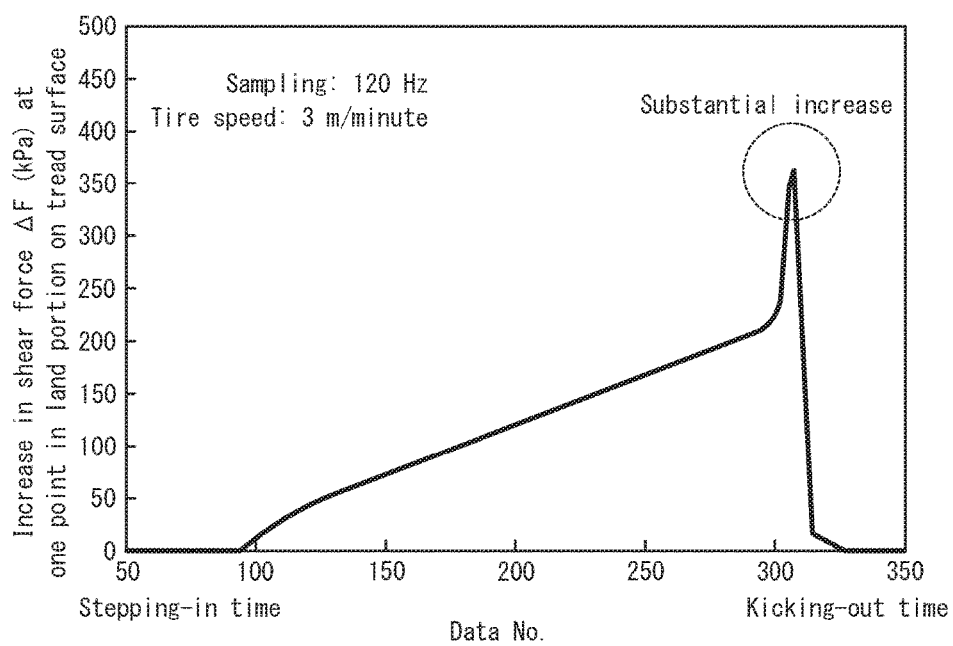
FIG. 3 illustrates a relationship between time and an increase in shear force ΔF from a stepping-in time to a kicking-out time at an arbitrary point in a land portion on the tread surface illustrated in FIG. 1.
Figure 5:
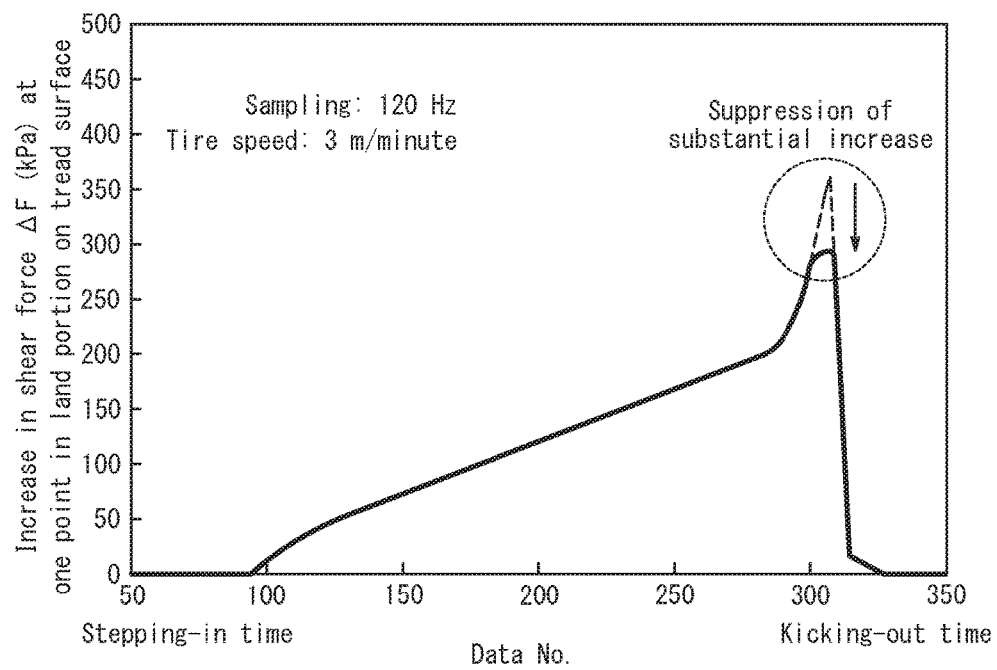
FIG. 5 illustrates a relationship between time and an increase in shear force ΔF from a stepping-in time to a kicking-out time at an arbitrary point in the land portion illustrated in FIG. 4.

As a result of the land portion sections $4p$ being further defined in the land portions 4 as described above, the above-described consecutive repetition of slipping and expansion in the land portions illustrated in FIG. 2 can be cut off and the above-described increase in tread circumferential-direction shear force at a point on the tread surface that occurs at the kicking-out time can be suppressed. Therefore, tire wear resistance can be improved.

Figure 14:
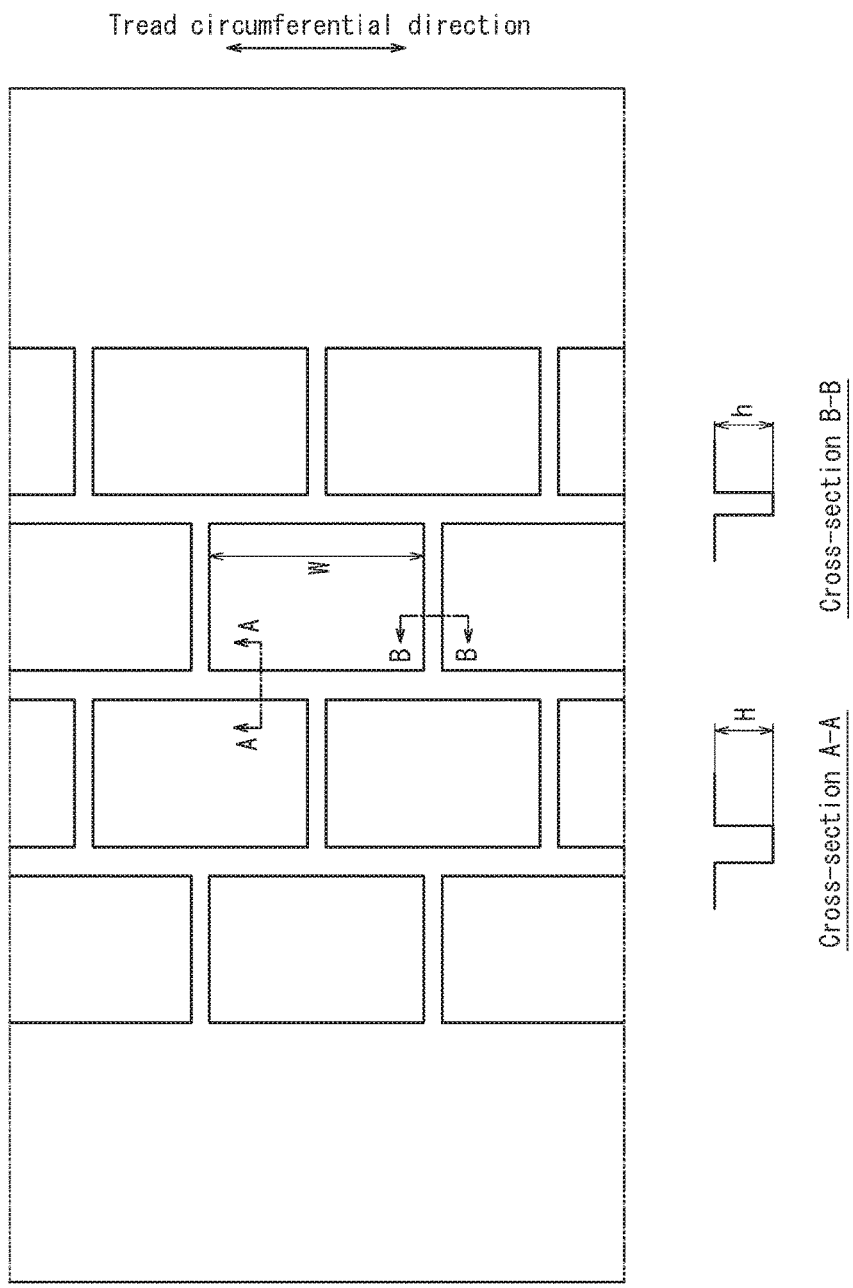
FIG. 14 is a developed view illustrating a tread surface of a heavy duty pneumatic tire that is a comparative example for the exemplary heavy duty pneumatic tire of the present disclosure.

FIG. 14 is a developed view illustrating a tread surface of a heavy duty pneumatic tire that is a comparative example for the exemplary heavy duty pneumatic tire of the present disclosure.

In the exemplary heavy duty tire 1, a depth of the circumferential-direction grooves 3 that define the land portions 4, which is represented by H as shown in FIG. 6, is required to satisfy a relationship 7 mm≤H≤13 mm. In addition, a tread circumferential-direction spacing of the narrow width-direction grooves, which is represented by W as shown in FIG. 6, is required to satisfy a relationship 5 mm≤W≤20 mm.

FIG. 7a illustrates measurement results of a relationship between the tread circumferential-direction spacing W of the narrow width-direction grooves and the above-described increase in tread circumferential-direction shear force ΔF at the kicking-out time that were obtained for various circumferential-direction groove depths H. The shear force was measured using a three-component force sensor mounted on a flat plate while rolling the tire on the flat plate.

FIG. 7b illustrates measurement results of a relationship between the tread circumferential-direction spacing W of the narrow width-direction grooves and land portion rigidity that were obtained for various circumferential-direction groove depths H. The land portion rigidity was obtained by pressing a tread pattern section, cut out from the tire, against a flat plate and using a load cell to measure a reactive force when shear deformation of the tread pattern section occurred; the measured reactive force was used as an indicator of the land portion rigidity.

As illustrated in FIG. 7a, the above-described increase in tread circumferential-direction shear force ΔF that occurs at the kicking-out time can be suppressed and tire wear resistance can be improved by setting H as at least 7 mm. On the other hand, as illustrated in FIG. 7b, substantial reduction in land portion rigidity can be suppressed and reduction in tire traction performance can be sufficiently suppressed by setting H as no greater than 13 mm.

Also, as illustrated in FIG. 7a, the above-described increase in tread circumferential-direction shear force ΔF that occurs at the kicking-out time can be suppressed and tire wear resistance can be improved by setting W as no greater than 20 mm. On the other hand, as illustrated in FIG. 7b, substantial reduction in land portion rigidity can be suppressed and reduction in tire traction performance can be sufficiently suppressed by setting W as at least 5 mm.

Figure 9:
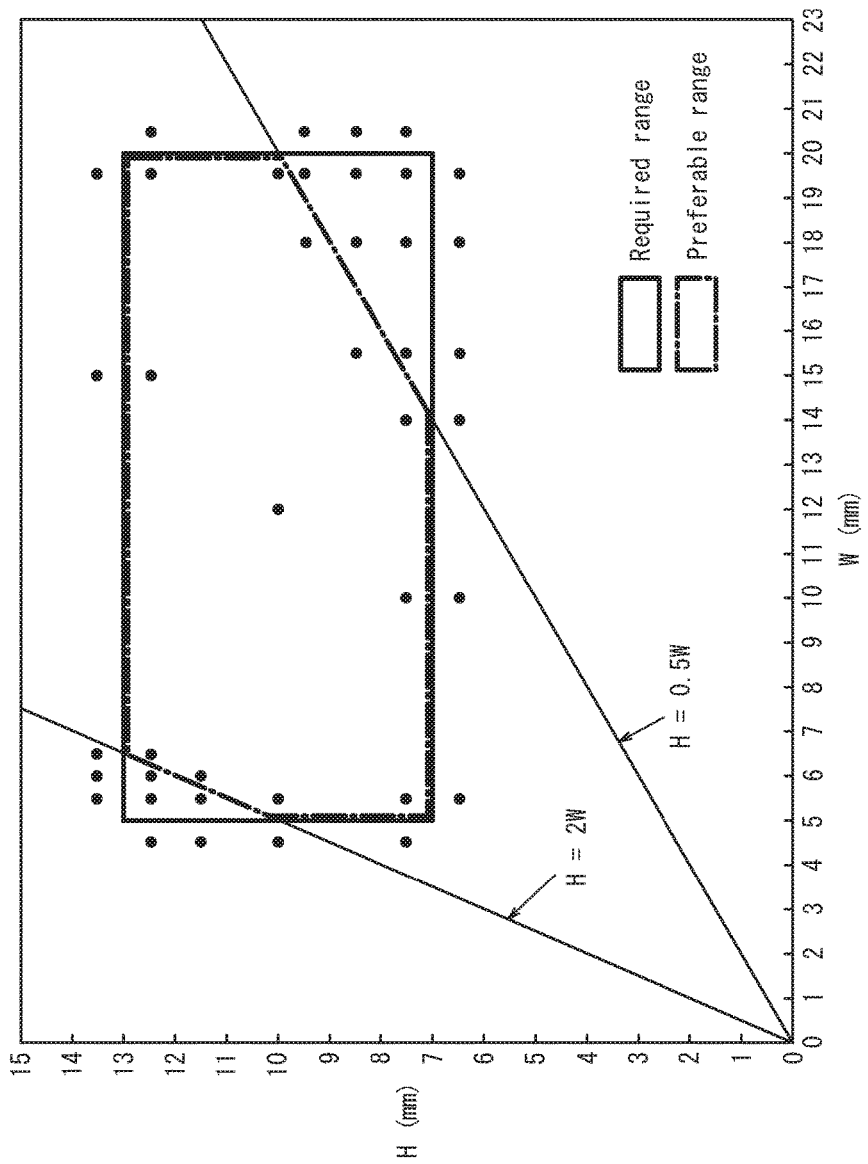
FIG. 9 illustrates a relationship between the tread circumferential-direction spacing W of narrow width-direction grooves and the circumferential-direction groove depth H, and a relationship between W and H that is satisfied by the heavy duty pneumatic tire of the present disclosure.

Therefore, a favorable balance of wear resistance and traction performance can be achieved by setting W and H in the ranges described above. The above-described ranges (required range) for W and H are indicated by solid lines in FIG. 9.

It should be noted that values in the above-described range for the circumferential-direction groove depth H are smaller than the circumferential-direction groove depth of a normal heavy duty pneumatic tire (for example, 18 mm). Through the above, the substantial reduction in land portion rigidity that occurs due to provision of the narrow width-direction grooves in the land portions can be suppressed and the reduction in tire traction performance can be sufficiently suppressed.

Furthermore, the amount of rubber used as tread rubber can be reduced. Reduction in the amount of rubber is advantageous in terms of reducing tire weight and tire manufacturing cost.

In the exemplary heavy duty tire 1, the tread circumferential-direction spacing W of the narrow width-direction grooves and the circumferential-direction groove depth H preferably satisfy a relationship 0.5≤W/H≤2.0.

FIG. 8a illustrates measurement results of a relationship between a ratio (W/H) of the tread circumferential-direction spacing W of the narrow width-direction grooves relative to the circumferential-direction groove depth H and the increase in tread circumferential-direction shear force ΔF at the kicking-out time that were obtained for various circumferential-direction groove depths H. FIG. 8b illustrates measurement results of a relationship between the ratio (W/H) of the tread circumferential-direction spacing W of the narrow width-direction grooves relative to the circumferential-direction groove depth H and land portion rigidity that were obtained for various circumferential-direction groove depths H.

As illustrated in FIG. 8a, the above-described increase in tread circumferential-direction shear force ΔF that occurs at the kicking-out time can be suppressed and tire wear resistance can be improved by setting W/H as no greater than 2.0. Also, as illustrated in FIG. 8b, substantial reduction in land portion rigidity can be suppressed and reduction in tire traction performance can be further suppressed by setting W/H as at least 0.5.

Therefore, a balance of high levels of wear resistance and traction performance can be achieved by setting W/H in the range described above. The above-described range (preferable range) for W and H is indicated by a dashed line in FIG. 9.

In addition, the tread width-direction length of the narrow width-direction grooves, which is represented by m as illustrated in FIG. 6, and the tread width-direction width of the land portions in which the narrow width-direction grooves are provided, which is represented by M as illustrated in FIG. 6, preferably satisfy a relationship m≥0.5M. If m is less than 0.5M, it may not be possible to cut off repeated slipping and expansion in the land portions and it may not be possible to suppress the substantial increase in tread circumferential-direction frictional force that occurs at the kicking-out time.

In the exemplary heavy duty tire 1, the circumferential-direction groove depth H and the narrow width-direction groove depth h preferably satisfy a relationship 0.6≤h/H≤1.0. Setting h/H as at least 0.6 ensures that the above-described effect of cutting off repeated slipping and expansion in the land portions can be achieved and consequently ensures that the above-described effect of suppressing the increase in tread circumferential-direction shear force that occurs at the kicking-out time can be sufficiently achieved. Therefore, tire wear resistance can be further improved. On the other hand, setting h/H as no greater than 1.0 enables the configuration of the present disclosure to be obtained in which the land portions are partitioned into land portion sections.

In the exemplary heavy duty tire 1, the tread circumferential-direction width w of the narrow width-direction grooves 5 is preferably from 0.5 mm to 1.5 mm.

Figure 17:
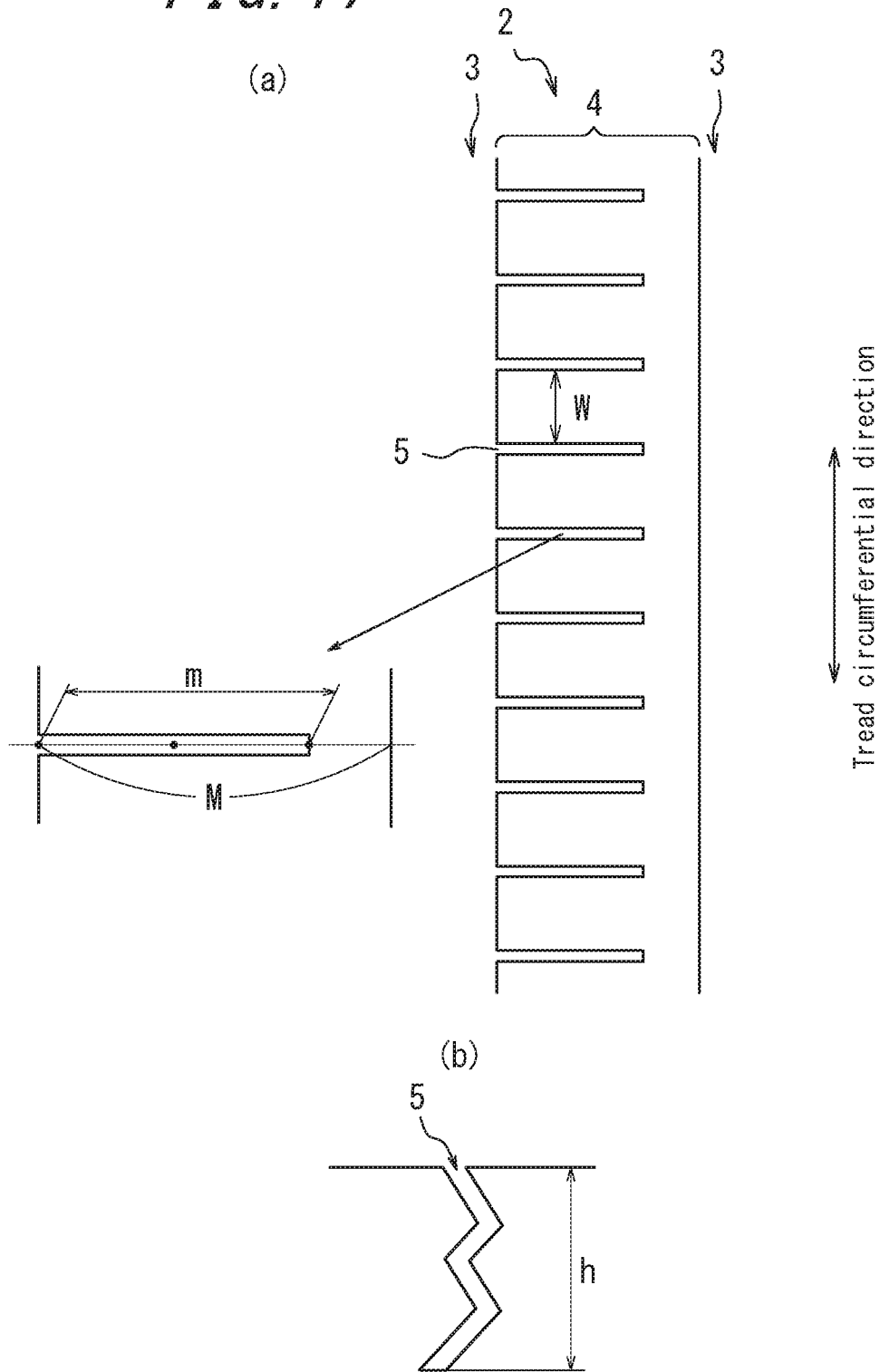
FIG. 17a illustrates an example of narrow width-direction grooves provided in a heavy duty pneumatic tire of the present disclosure that each have an end that terminates within a land portion.
FIG. 17b illustrates an example of a narrow width-direction groove provided in a heavy duty pneumatic tire of the present disclosure that extends in a bend shape in a tire radial direction.

In the exemplary heavy duty tire 1, either or both ends of the narrow width-direction grooves 5 may terminate within the land portions 4 without opening onto the circumferential-direction grooves 3 (refer to FIG. 17a). Although the land portion sections 4p are not completely defined in the land portions 4 in the above configuration, the above configuration enables the above-described effect of cutting off repeated slipping and expansion to be achieved, and consequently enables the above-described effect of suppressing the increase in tread circumferential-direction shear force at the kicking-out time to be achieved. At the same time, reduction in land portion rigidity can be effectively suppressed as a result of the land portion sections 4p not being completely defined in the land portions 4.

In the exemplary heavy duty tire 1, the narrow width-direction grooves 5 preferably each extend in a bent shape in a tire radial direction (refer to FIG. 17b). The above configuration enables a structure in which the land portion sections defined by the narrow width-direction grooves support one another when force in the tread circumferential direction is input and consequently enables suppression of substantial reduction in land portion rigidity. Therefore, reduction in tire traction performance can be further suppressed. No specific limitations are placed on "extending in a bent shape in a tire radial direction" and the bent shape may for example be a zigzag-shape or a wavy-shape.

Figure 10:
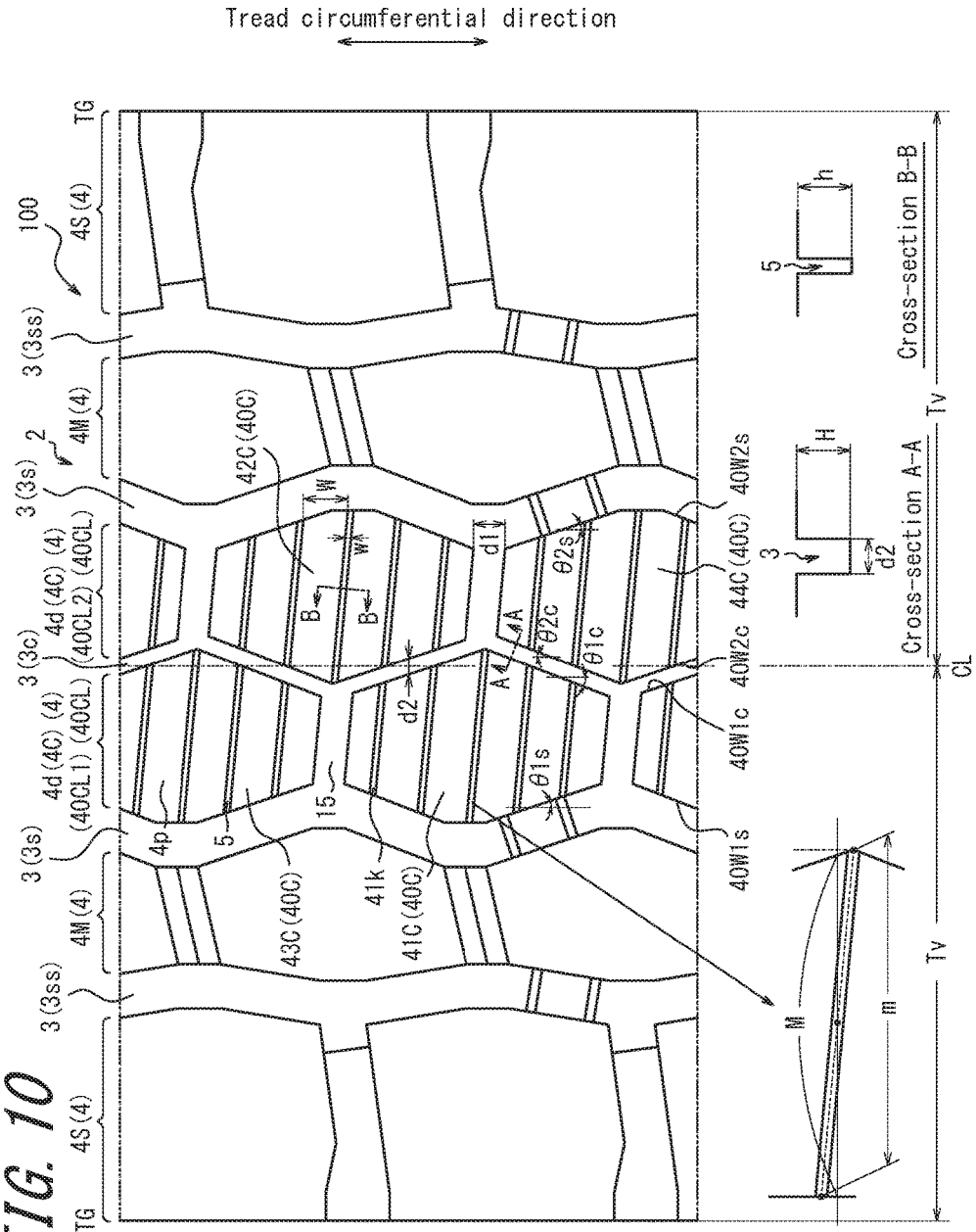
FIG. 10 is a developed view illustrating a tread surface of an alternative exemplary heavy duty pneumatic tire of the present disclosure.

FIG. 10 is a developed view illustrating a tread surface of an alternative exemplary heavy duty pneumatic tire of the present disclosure. In the following description, elements that are the same as in the exemplary heavy duty pneumatic tire of the present disclosure illustrated in FIG. 6 are assigned the same reference signs and explanation thereof is omitted.

Figure 15:
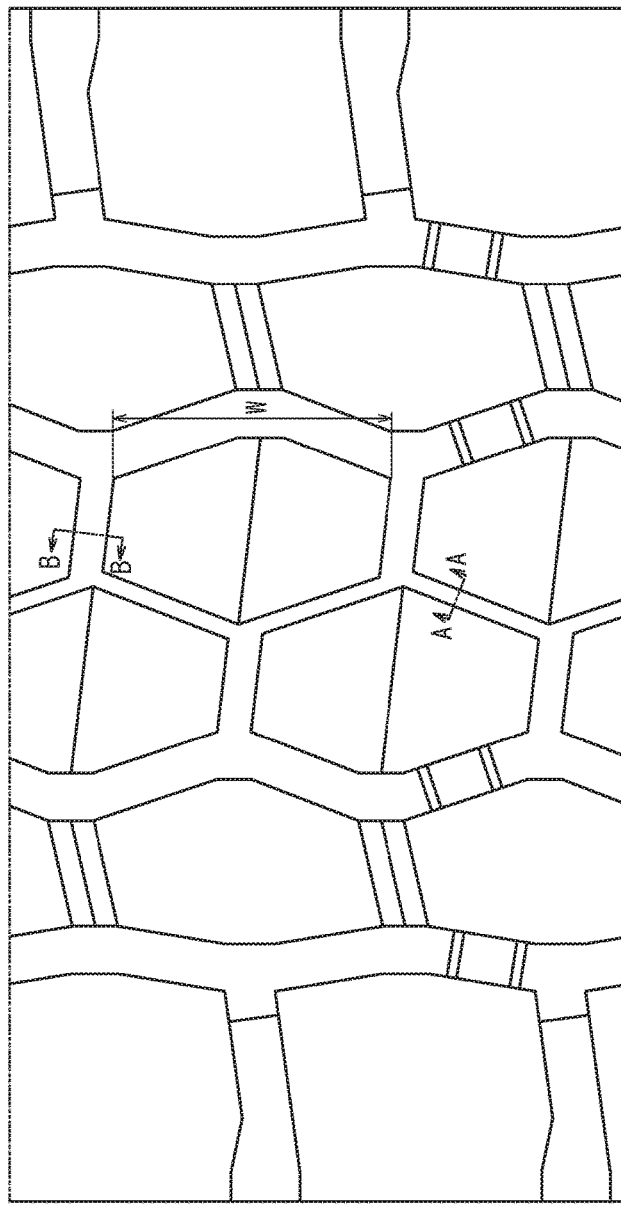
FIG. 15 is a developed view illustrating a tread surface of a heavy duty pneumatic tire that is a comparative example for the alternative exemplary heavy duty pneumatic tire of the present disclosure.

FIG. 15 is a developed view illustrating a tread surface of a heavy duty pneumatic tire that is a comparative example for the alternative exemplary heavy duty pneumatic tire of the present disclosure.

The alternative exemplary heavy duty pneumatic tire 100 of the present disclosure (also referred to below as "alternative exemplary heavy duty tire 100") includes a tire tread surface 2 having a plurality of circumferential-direction grooves 3 extending along a tread circumferential line (five circumferential-direction grooves 3 in FIG. 10 composed of one relatively narrow circumferential-direction groove 3c, two relatively wide circumferential-direction grooves 3s, and two relatively wide circumferential-direction grooves 3ss) and land portions 4 (land portions 4C, 4M, and 4S) defined between the circumferential-direction grooves 3 or between the circumferential-direction grooves 3 and tread ground contact edges TG. Among the land portions 4, the land portions 4C in particular are partitioned land portions 4d in which a plurality (a large number in FIG. 10) of narrow width-direction grooves 5 extending in the tread width direction are provided and in which land portion sections 4p are further defined between the narrow width-direction grooves 5. The alternative exemplary heavy duty tire 100 has a prescribed internal pressure of, for example, at least 750 kPa.

It should be noted that so long as the above-described land portions are provided on at least a section of the tread surface of the heavy duty pneumatic tire of the present disclosure, the above-described land portions do not need to be provided over the entire tire tread surface. Also note that so long as the land portions provided in the heavy duty pneumatic tire of the present disclosure include at least one partitioned land portion, it is not necessary for all of the land portions to be partitioned land portions.

In the alternative exemplary heavy duty tire 100, a plurality (four in FIG. 10) of wide width-direction grooves 15 extending in the tread width direction are preferably provided in the land portions 4C such that a plurality of land portion blocks 40C (41C to 44C in FIG. 10) are further defined in the land portions 4C by the wide width-direction grooves 15. In other words, the land portions 4C composed by the land portion blocks 40C are preferably land portion block rows 40CL (40CL1 and 40CL2 in FIG. 10) that extend continuously in the tread circumferential direction.

Furthermore, the alternative exemplary heavy duty tire 100 preferably has a plurality of the land portion block rows 40CL in the tread width direction (the two rows 40CL1 and 40CL2 in FIG. 10), and the land portion block rows are preferably arranged such that adjacent land portion rows are at shifted pitch relative to one another (shifted by a half pitch in FIG. 10).

Among side walls 40W1c, 40W1s, 40W2c, and 40W2s of the land portion block rows 40CL1 and 40CL2 that are adjacent in the tread width direction, suppose that the side walls 40W1c and 40W2c on the same side as the circumferential-direction groove 3c between the adjacent land portion block rows in the tread width direction have inclination angles θ1c and θ2c relative to the tread circumferential direction, and suppose that the side walls 40W1s and 40W2s on the opposite side to the aforementioned circumferential-direction groove in the tread width direction have inclination angles θ1s and θ2s relative to the tread circumferential direction. In such a situation, θ1c is preferably greater than θ1s and θ2c is preferably greater than θ2s. It should be noted that "inclination angle relative to the tread circumferential direction" refers to a smaller angle among angles formed with the tread circumferential direction.

Furthermore, in the alternative exemplary heavy duty tire 100, the circumferential-direction grooves 3 are preferably inclined relative to the tread circumferential direction and the tread width direction, a distance d2 between land portion blocks 40C that are adjacent in the tread width direction is preferably smaller than a distance d1 between land portion blocks 40C that are adjacent in the tread circumferential direction, and the tread width-direction width of each of the land portion blocks 40C preferably increases toward a central part of the land portion block 40C from both ends of the land portion block 40C in the tread circumferential direction.

The configuration described above produces the following interaction.

Figure 11:
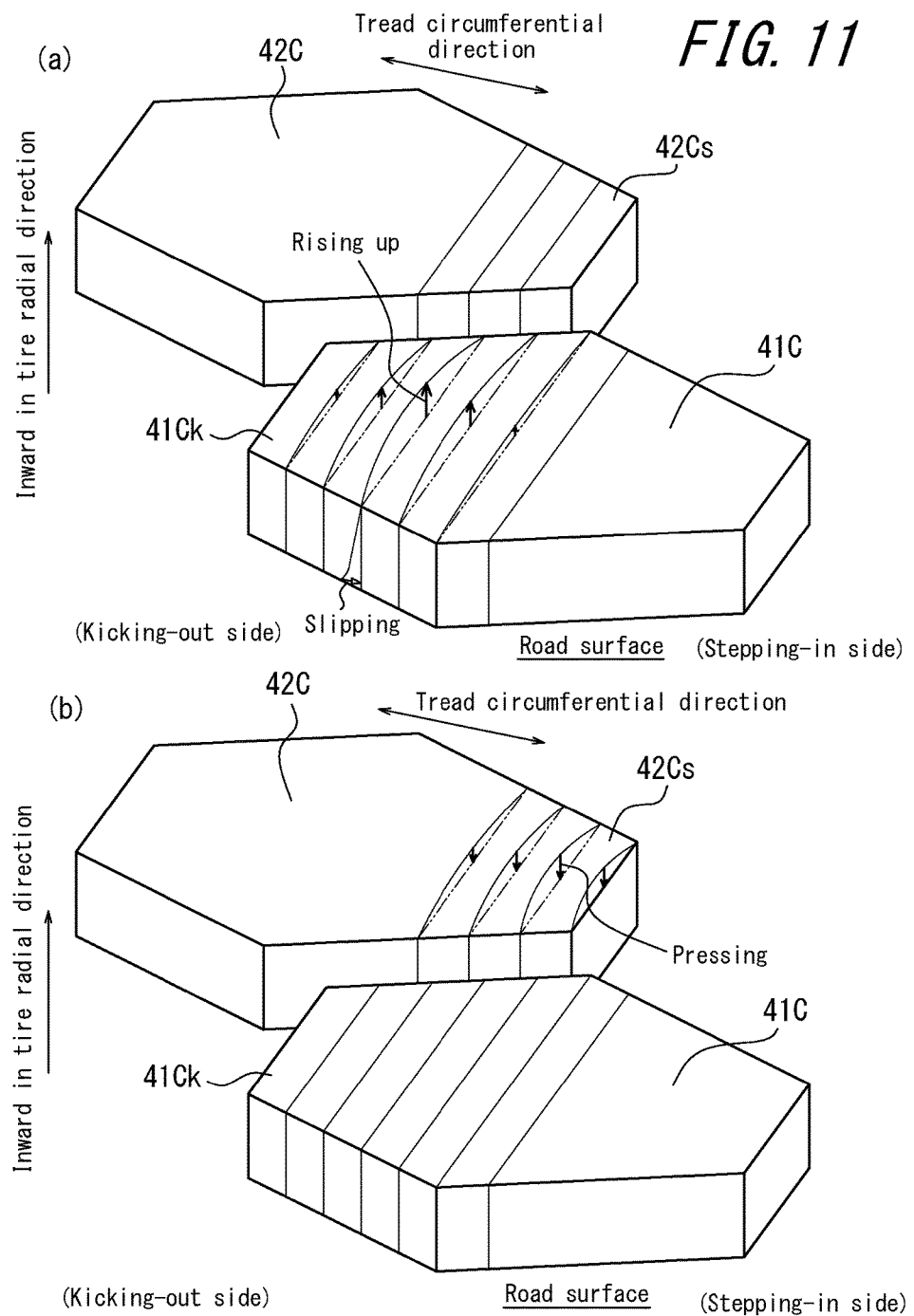
FIGS. 11a and 11b illustrate an interaction between land portions provided in the alternative exemplary heavy duty pneumatic tire of the present disclosure.

FIG. 11 illustrates only land portion blocks 41C and 42C of the alternative exemplary heavy duty tire 100 illustrated in FIG. 10 (the narrow width-direction grooves provided in the land portions are omitted in FIG. 11 for the sake of simplicity). As illustrated in FIG. 11a, during loaded rolling of the tread surface 2, after shear deformation of a kicking-out side section 41Ck of the land portion block 41C that has already been grounded increases, slipping (indicated by a small arrow in FIG. 11a) occurs in the kicking-out side section 41Ck to release the shear deformation. In the situation described above, recoil of the slipping causes a phenomenon in which rubber around the kicking-out side section 41Ck of the land portion rises up inwardly in the tire radial direction (indicated by thick arrows in FIG. 11a). The above phenomenon causes an interaction in which a stepping-in side section 42Cs of the next land portion 42C, which is adjacent to the land portion 41C in the tread width direction, is pressed against the road surface (indicated by thick arrows in FIG. 11b), and efficiently generates tread circumferential-direction shear force at the stepping-in time of the next land portion 42C. The above interaction can even out tread circumferential-direction shear force acting on the land portions between the stepping-in time and the kicking-out time.

Figure 12:
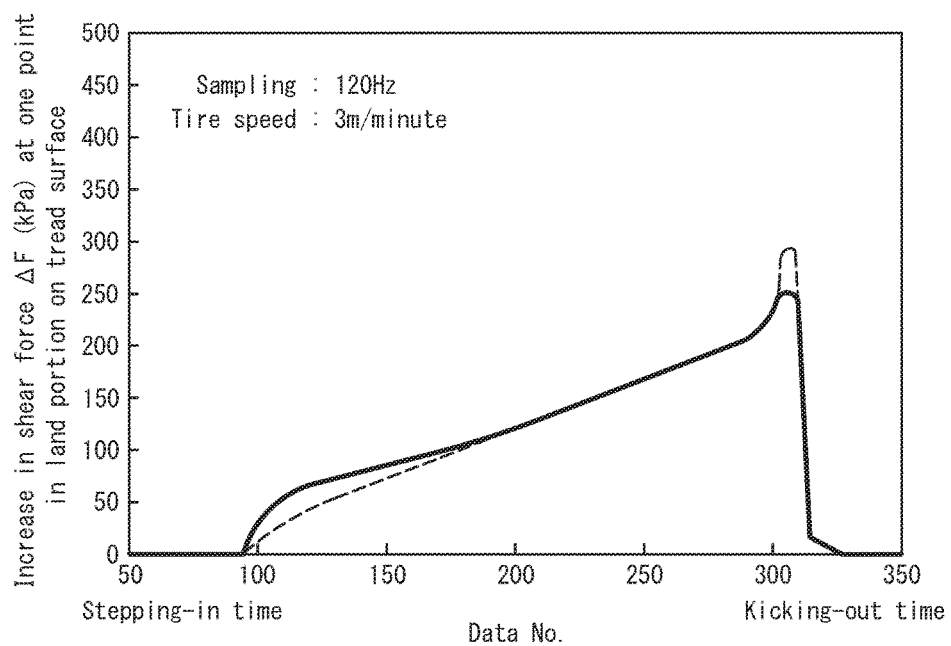
FIG. 12 illustrates a relationship between time and an increase in shear force ΔF from a stepping-in time to a kicking-out time at an arbitrary point in a land portion provided in the heavy duty pneumatic tire having the tread surface illustrated in FIG. 10.

FIG. 12 illustrates a profile of the increase in tread circumferential-direction shear force ΔF that occurs at the kicking-out time. Use of the tread surface described above can even out circumferential-direction shear force by generating a relatively large circumferential-direction shear force from the stepping-in time. It should be recognized that, as a result, the substantial increase in circumferential-direction shear force that occurs at the kicking-out time can be reduced in size.

Therefore, the alternative exemplary heavy duty tire 100 can suppress wear of the land portions and further improve tire wear resistance.

In the alternative exemplary heavy duty tire 100, the land portions 4C, which are partitioned land portions, are preferably provided in a range of from 0% to 40% of a tread ground contact half-width Tv from a tire equator CL as a center.

Furthermore, in the alternative exemplary heavy duty tire 100, the land portions 4C, which are partitioned land portions, are preferably the closest land portions 4 to the tire equator CL. In such a configuration, the tire equator CL may be located along a land portion 4 or may be located along a circumferential-direction groove 3 that defines land portions 4 at outer edges thereof in the tire width direction.

Figure 13:
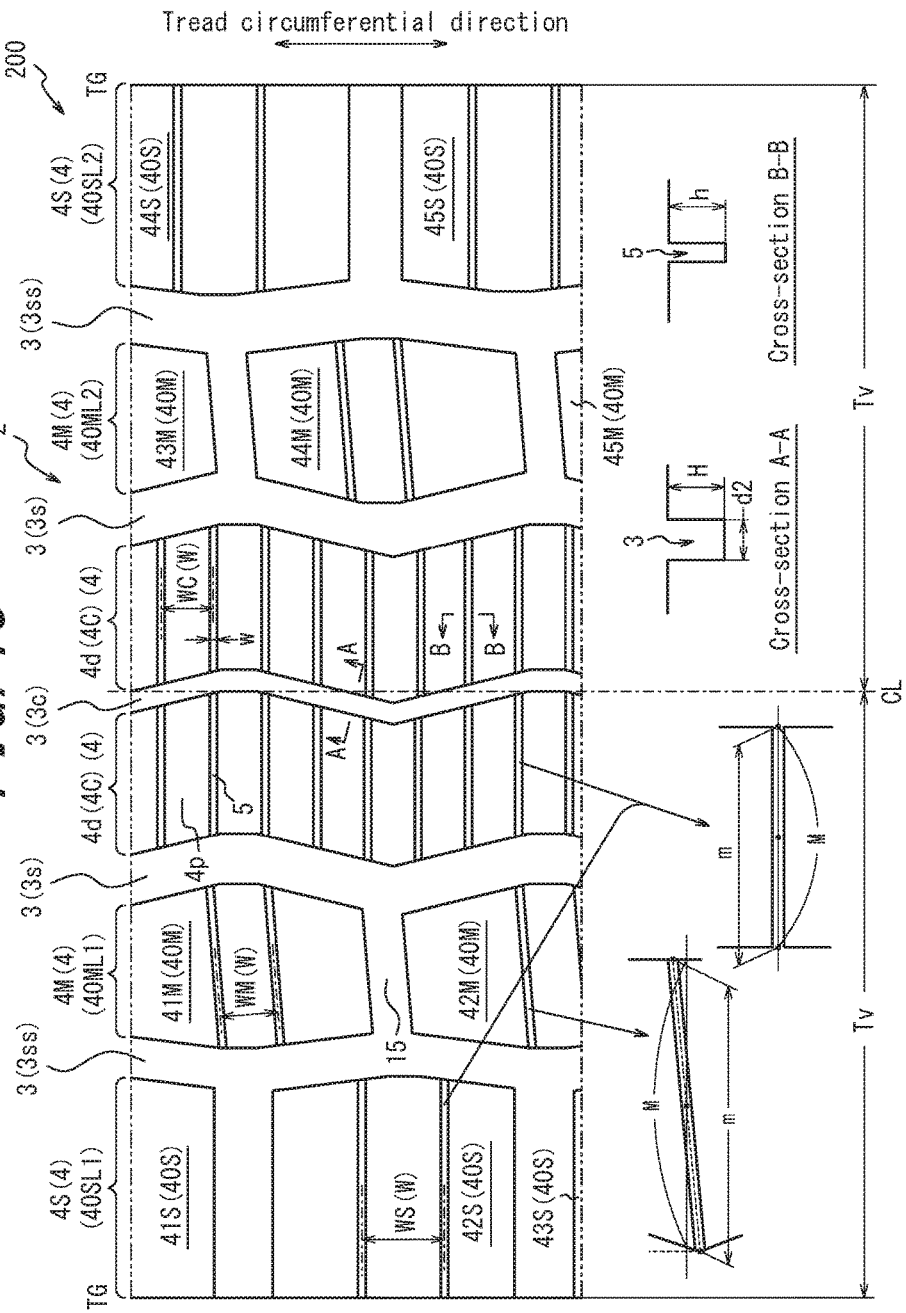
FIG. 13 is a developed view illustrating a tread surface of a further exemplary heavy duty pneumatic tire of the present disclosure.

FIG. 13 is a developed view illustrating a tread surface of a further exemplary heavy duty pneumatic tire of the present disclosure. In the following description, elements that are the same as in the exemplary heavy duty pneumatic tire of the present disclosure illustrated in FIG. 6 are assigned the same reference signs and explanation thereof is omitted.

Figure 16:
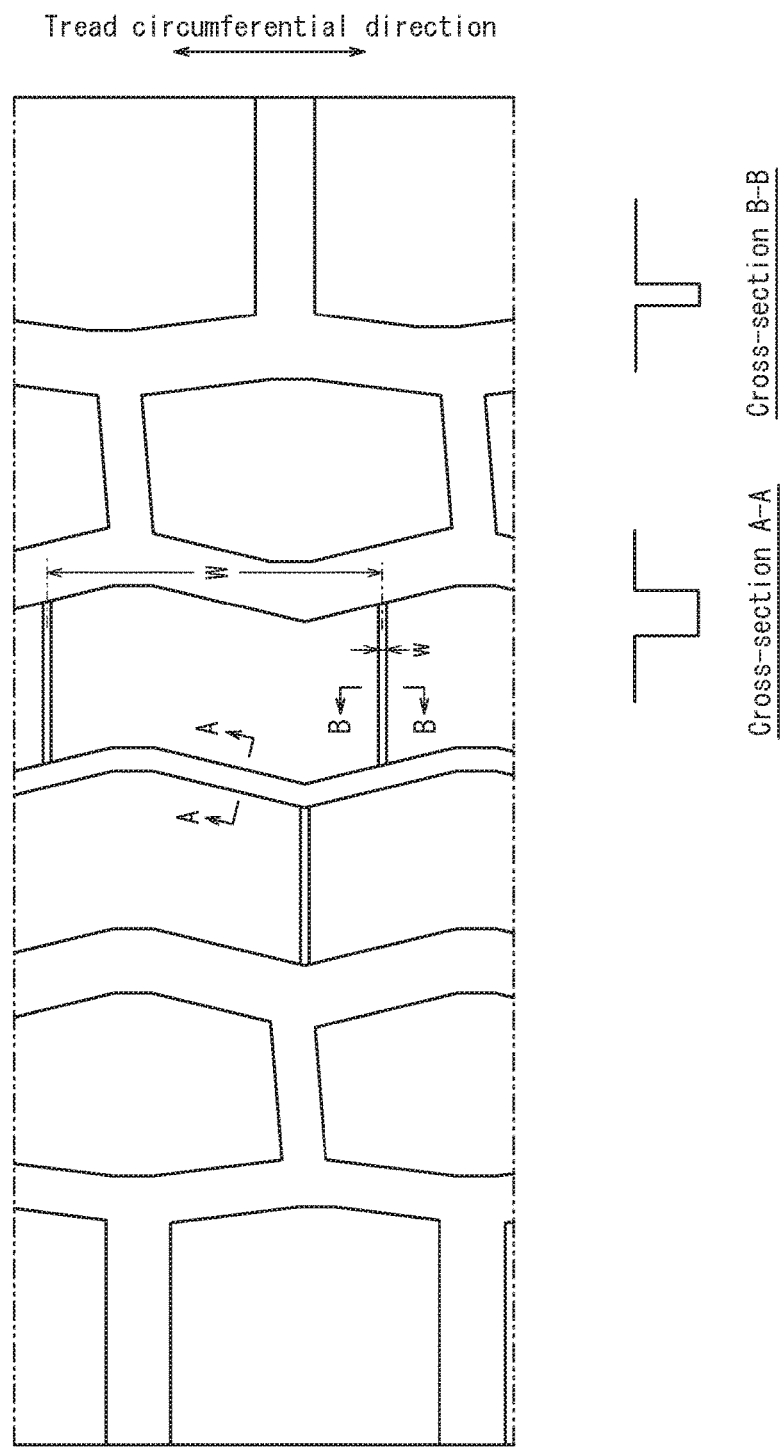
FIG. 16 is a developed view illustrating a tread surface of a heavy duty pneumatic tire that is a comparative example for the further exemplary heavy duty pneumatic tire of the present disclosure.

FIG. 16 is a developed view illustrating a tread surface of a heavy duty pneumatic tire that is a comparative example for the further exemplary heavy duty pneumatic tire of the present disclosure.

The further exemplary heavy duty pneumatic tire 200 of the present disclosure (also referred to below as "further exemplary heavy duty tire 200") includes a tire tread surface 2 having a plurality of circumferential-direction grooves 3 extending along a tread circumferential line (five circumferential-direction grooves 3 in FIG. 13 composed of one relatively narrow circumferential-direction groove 3c, two relatively wide circumferential-direction grooves 3s, and two relatively wide circumferential-direction grooves 3ss) and land portions 4 (land portions 4C, 4M, and 4S) defined between the circumferential-direction grooves 3 or between the circumferential-direction grooves 3 and tread ground contact edges TG. The land portions 4 (land portions 4C, 4M, and 4S) are partitioned land portions 4d in which a plurality (a large number in FIG. 13) of narrow width-direction grooves 5 extending in the tread width direction are provided and land portion sections 4p are further defined in the land portions 4C between the narrow width-direction grooves 5. The further exemplary heavy duty pneumatic tire 200 has a prescribed internal pressure of, for example, at least 750 kPa.

It should be noted that so long as the above-described land portions are provided on at least a section of the tread surface of the heavy duty pneumatic tire of the present disclosure, the above-described land portions do not need to be provided over the entire tire tread surface. Also note that so long as the land portions provided in the heavy duty pneumatic tire of the present disclosure include at least one partitioned land portion, it is not necessary for all of the land portions to be partitioned land portions.

In the further exemplary heavy duty tire 200, a plurality (three in FIG. 13) of wide width-direction grooves 15 extending in the tread width direction are preferably provided in the land portions 4M such that the wide width-direction grooves 15 further define a plurality of land portion blocks 40M (41M to 45M in FIG. 13) in the land portions 4M. In other words, the land portions 4M composed by the land portion blocks 40M preferably form land portion block rows 40ML (40ML1 and 40ML2 in FIG. 13) that extend continuously in the tread circumferential direction.

Also, in the further exemplary heavy duty tire 200, a plurality (three in FIG. 13) of wide width-direction grooves 15 extending in the tread width direction are preferably provided in the land portions 4S such that the wide width-direction grooves 15 further define a plurality of land portion blocks 40S (41S to 45S in FIG. 13) in the land portions 4S. In other words, the land portions 4S composed by the land portion blocks 40S preferably form land portion block rows 40SL (40SL1 and 40SL2 in FIG. 13) that extend continuously in the tread circumferential direction.

Furthermore, in the further exemplary heavy duty tire 200, there are preferably a plurality of land portion block rows 40ML and a plurality of land portion block rows 40SL in the tread width direction (two rows 40ML1 and 40ML2, and two rows 40SL1 and 40SL2 in FIG. 13) and such land portion rows are preferably arranged such that adjacent land portion rows are at shifted pitch relative to one another.

In the further exemplary heavy duty tire 200, a tread circumferential-direction spacing WC (W) of the narrow width-direction grooves 5 in the land portions 4C, which are partitioned land portions 4d, is preferably smaller than a tread circumferential-direction spacing WM (W) of the narrow width-direction grooves 5 in the land portions 4M, which are also partitioned land portions 4d.

Likewise, the tread circumferential-direction spacing WC (W) of the narrow width-direction grooves 5 in the land portions 4C, which are partitioned land portions 4d, is preferably smaller than a tread circumferential-direction spacing WS (W) of the narrow width-direction grooves 5 in the land portions 4S, which are also partitioned land portions 4d.

Further likewise, the tread circumferential-direction spacing WM (W) of the narrow width-direction grooves 5 in the land portions 4M, which are partitioned land portions 4d, is preferably smaller than the tread circumferential-direction spacing WS (W) of the narrow width-direction grooves 5 in the land portions 4S, which are also partitioned land portions 4d.

The configuration described above enables an effect of sufficiently suppressing reduction in tire traction performance to be achieved in a tread shoulder region while also enabling an effect of improving tire wear resistance to be achieved in a tread central region that is susceptible to wear to due relatively high ground contact pressure. As a result, tire life can be extended by evening out tire wear over the tread width direction while also achieving a favorable balance of tire wear resistance and tire traction performance.

It should be noted that the heavy duty pneumatic tire of the present disclosure is not limited to the configuration described above. The same effects as described above can be achieved in a configuration in which the land portions include a first partitioned land portion and a second partitioned land portion located outward in the tread width direction relative to the first partitioned land portion by setting a tread circumferential-direction spacing of narrow width-direction grooves in the second partitioned land portion as greater than a tread circumferential-direction spacing of narrow width-direction grooves in the first partitioned land portion. For example, the heavy duty pneumatic tire of the present disclosure may be a tire in which the land portions 4C of the tire illustrated in FIG. 13 are not partitioned land portions, a tire in which the land portions 4M of the tire illustrated in FIG. 13 are not partitioned land portions, or a tire in which the land portions 4S of the tire illustrated in FIG. 13 are not partitioned land portions.

In the further exemplary heavy duty tire 200, WC (W) is preferably smaller than WM (W) and WM (W) is preferably smaller than WS (W) as explained further above.

The above configuration makes it easier to achieve the above-described effect of extending tire life while also achieving a favorable balance of tire wear resistance and tire traction performance.

In the further exemplary heavy duty tire 200, the land portions 4C are preferably provided in a range from 0% to 40% of a tread ground contact half-width Tv from a tire equator CL as a center. The effect of improved tire wear resistance can be obtained efficiently through the configuration described above due to the fact that ground contact pressure is particularly high and wear has a high tendency to occur in the aforementioned range.

Furthermore, in the further exemplary heavy duty tire 200, the land portions 4C, which are partitioned land portions, are preferably the closest land portions 4 to the tire equator CL. In such a configuration, the tire equator CL may be located along a land portion 4 or may be located along a circumferential-direction groove 3 that defines land portions 4 at outer edges thereof in the tire width direction.

It should also be noted that the land portions 4M may be provided in a range from 30% to 65% of the tread ground contact half-width Tv from the tire equator CL as a center, and the land portions 4S may be provided in a range from 65% to 100% of the tread ground contact half-width Tv from the tire equator CL.

The heavy duty pneumatic tire of the present disclosure can for example have a normal structure (not illustrated) including a tread portion, a pair of sidewall portions that extend inward in the tire radial direction from both sides of the tread portion, bead portions that extends inward in the tire radial direction from the sidewall portions, a carcass that extends in a toroidal shape across the bead portions, and a belt located outward of the carcass in the tire radial direction.

EXAMPLES

Although the following provides further detail by way of examples, the present disclosure is in no way limited to the following examples.

Heavy duty tires (275/80R22.5) were used in the examples.

(Test A)

In Example A1, a heavy duty tire with specifications shown in Table 1 was prepared. A heavy duty tire with specifications shown in Table 1 was also prepared in Comparative Example A1. In test A, m=1.0M and h=H.

(Tire Weight Calculation)

The weight per each of the heavy duty tires described above was calculated. Specifically, an index serving as a comparative evaluation was calculated by taking the evaluation result for Comparative Example A1 to be 100. Table 1 shows the evaluation results. A smaller index value indicates a greater effect of reducing tire weight.

(Running Performance Evaluation)

The prepared heavy duty tire was mounted on an applicable rim (7.25×22.5) stipulated by JATMA regulations to prepare a rim-mounted heavy duty tire which was then used as a heavy duty pneumatic tire under conditions of an internal pressure of 900 kPa and a load of 3.0 t. Running performance of the heavy duty pneumatic tire was evaluated by performing tests described below in (1) and (2) with the heavy duty pneumatic tire mounted on a vehicle.

(1) Wear Resistance Test

The vehicle was run by a test driver at 80 km/hour for 10,000 km on a test course having a paved road surface. The wear resistance of the heavy duty pneumatic tire was evaluated using a wear resistance index that was calculated based on remaining groove depth measured after running. Specifically, an index serving as a comparative evaluation was calculated by taking the evaluation result for Comparative Example A1 to be 100. Table 1 shows the evaluation results. A larger index value indicates higher wear resistance.

(2) Traction Performance (Driving Performance) Test

The test driver caused the vehicle to make a roaring start from stationary on a test course having a dry road surface. Traction performance (driving performance) of the heavy duty pneumatic tire was evaluated by measuring the amount of time that the vehicle required to reach a speed of 60 km/hour. Specifically, an index serving as a comparative evaluation was calculated by taking the evaluation result for Comparative Example A1 to be 100. Table 1 shows the evaluation results. A larger index value indicates higher traction performance (driving performance) on a dry road surface.

Performance was evaluated in Examples A2 to A21 and Comparative Examples A2 to A19 in the same way as in Example A1 in all aspects other than that the pneumatic tires that were evaluated were prepared with specifications shown in Table 1. Table 1 shows the evaluation results. The diagram in FIG. 9, which illustrates the relationship between W and H that is satisfied by the heavy duty pneumatic tire of the present disclosure, summarizes the results shown in Table 1.

TABLE 1

| | | Tire specifications | | | Tire performance (index) | | |
| | | | Tread circumferential- | | Tire running performance | | |
| | | Circumferential- | direction spacing W | | | | |
| | | direction groove | (mm) of narrow width- | | | Traction | Tire |
| | Drawing | depth H (mm) | direction grooves | W/H | Wear resistance | performance | weight |
|---|---|---|---|---|---|---|---|
| Comparative Example A1 | FIG. 15 | 13.5 | 5.5 | 0.41 | 100.0 | 100.0 | 100.0 |
| Comparative Example A2 | FIG. 15 | 13.5 | 6.0 | 0.44 | 100.0 | 101.2 | 100.0 |
| Comparative Example A3 | FIG. 15 | 13.5 | 6.5 | 0.48 | 100.0 | 102.6 | 100.0 |
| Comparative Example A4 | FIG. 15 | 13.5 | 14.0 | 1.00 | 99.0 | 106.6 | 100.0 |

TABLE 1-continued

| | | | Tread circumferential-direction spacing W | | Tire performance (index) | | |
| --- | --- | --- | --- | --- | --- | --- | --- |
| | | Circumferential-direction groove depth H (mm) | (mm) of narrow width-direction grooves | W/H | Tire running performance | | |
| | Drawing | | | | Wear resistance | Traction performance | Tire weight |
| Comparative Example A5 | FIG. 15 | 13.5 | 19.5 | 1.40 | 98.0 | 108.6 | 100.0 |
| Comparative Example A6 | FIG. 15 | 12.5 | 4.5 | 0.36 | 95.9 | 108.1 | 98.4 |
| Example A1 | FIG. 10 | 12.5 | 5.5 | 0.44 | 101.3 | 109.3 | 98.4 |
| Example A2 | FIG. 10 | 12.5 | 6.0 | 0.48 | 102.3 | 110.5 | 98.4 |
| Example A3 | FIG. 10 | 12.5 | 6.5 | 0.52 | 105.0 | 110.9 | 98.4 |
| Example A4 | FIG. 10 | 12.5 | 14.0 | 1.10 | 105.9 | 113.1 | 98.4 |
| Example A5 | FIG. 10 | 12.5 | 19.5 | 1.60 | 105.0 | 113.2 | 98.4 |
| Comparative Example A7 | FIG. 15 | 12.5 | 20.5 | 1.60 | 100.4 | 113.1 | 98.4 |
| Comparative Example A8 | FIG. 15 | 11.5 | 4.5 | 0.39 | 95.0 | 110.9 | 96.8 |
| Example A6 | FIG. 10 | 11.5 | 5.5 | 0.48 | 101.6 | 111.1 | 96.8 |
| Example A7 | FIG. 10 | 11.5 | 6.0 | 0.52 | 105.7 | 111.4 | 96.8 |
| Comparative Example A9 | FIG. 15 | 10.0 | 4.5 | 0.45 | 97.4 | 114.6 | 94.3 |
| Example A8 | FIG. 10 | 10.0 | 5.5 | 0.55 | 105.0 | 113.9 | 94.3 |
| Example A9 | FIG. 10 | 10.0 | 12.0 | 1.20 | 107.8 | 111.7 | 94.3 |
| Example A10 | FIG. 10 | 10.0 | 19.5 | 2.00 | 105.7 | 112.3 | 94.3 |
| Example A11 | FIG. 10 | 9.5 | 18.0 | 1.90 | 105.0 | 113.4 | 93.5 |
| Example A12 | FIG. 10 | 9.5 | 19.5 | 2.10 | 102.4 | 113.2 | 93.5 |
| Comparative Example A10 | FIG. 15 | 9.5 | 20.5 | 2.20 | 99.8 | 113.1 | 93.5 |
| Example A13 | FIG. 10 | 8.5 | 15.5 | 1.80 | 105.1 | 114.7 | 91.9 |
| Example A14 | FIG. 10 | 8.5 | 18.0 | 2.10 | 102.9 | 114.3 | 91.9 |
| Example A15 | FIG. 10 | 8.5 | 19.5 | 2.30 | 101.2 | 114.1 | 91.9 |
| Comparative Example A11 | FIG. 15 | 8.5 | 20.5 | 2.40 | 100.0 | 114.0 | 91.9 |
| Comparative Example A12 | FIG. 15 | 7.5 | 4.5 | 0.60 | 100.0 | 115.5 | 90.3 |
| Example A16 | FIG. 10 | 7.5 | 5.5 | 0.73 | 104.7 | 115.7 | 90.3 |
| Example A17 | FIG. 10 | 7.5 | 10.0 | 1.30 | 105.7 | 116.1 | 90.3 |
| Example A18 | FIG. 10 | 7.5 | 14.0 | 1.90 | 104.7 | 115.9 | 90.3 |
| Example A19 | FIG. 10 | 7.5 | 15.5 | 2.10 | 103.3 | 115.6 | 90.3 |
| Example A20 | FIG. 10 | 7.5 | 18.0 | 2.40 | 102.3 | 115.2 | 90.3 |
| Example A21 | FIG. 10 | 7.5 | 19.5 | 2.60 | 101.4 | 115.1 | 90.3 |
| Comparative Example A13 | FIG. 15 | 7.5 | 20.5 | 2.70 | 100.4 | 115.0 | 90.3 |
| Comparative Example A14 | FIG. 15 | 6.5 | 5.5 | 0.85 | 88.0 | 116.7 | 88.7 |
| Comparative Example A15 | FIG. 15 | 6.5 | 10.0 | 1.50 | 88.8 | 116.1 | 88.7 |
| Comparative Example A16 | FIG. 15 | 6.5 | 14.0 | 2.20 | 87.7 | 115.9 | 88.7 |
| Comparative Example A17 | FIG. 15 | 6.5 | 15.5 | 2.40 | 86.9 | 115.6 | 88.7 |
| Comparative Example A18 | FIG. 15 | 6.5 | 18.0 | 2.80 | 86.1 | 116.2 | 88.7 |
| Comparative Example A19 | FIG. 15 | 6.5 | 19.5 | 3.00 | 85.3 | 116.0 | 88.7 |

(Test B)

In example B1, a heavy duty tire with the pattern illustrated in FIG. 10 was prepared with specifications shown in Table 2. In the test B, values for H (7.5 mm) and W (10 mm) in example A17, which had the best results in test A, were used for the land portions 4C. In addition, "tire weight calculation" and "running performance evaluation" were carried out for each tire in the same way as described above (test A). Table 2 shown the evaluation results.

Performance was evaluated in Examples B2 to B6 in the same way as in Example B1 in all aspects other than that the pneumatic tires that were evaluated were prepared with specifications shown in Table 2. Table 2 shows the evaluation results.

TABLE 2

| | | Tire specifications | | | | | | Tire performance (index) | | |
| --- | --- | --- | --- | --- | --- | --- | --- | --- | --- | --- |
| | | Tread circumferential-direction width m (mm) of narrow width-direction grooves | Tread width-direction width M (mm) of land portions | m/M | Narrow width-direction groove depth h (mm) | h/H | Three-dimensional narrow width-direction grooves | Tire running performance | | |
| | Drawing | | | | | | | Wear resistance | Traction performance | Tire weight |
| Example B1 | FIG. 10 | 5.5 | 10 | 0.55 | 7.5 | 1.00 | No | 100.4 | 118.0 | 90.3 |
| Example B2 | FIG. 10 | 4.5 | 10 | 0.45 | 7.5 | 1.00 | No | 99.0 | 122.2 | 90.3 |
| Example B3 | FIG. 10 | 5.5 | 10 | 0.55 | 4.0 | 0.53 | No | 98.0 | 118.0 | 90.3 |
| Example B4 | FIG. 10 | 5.5 | 10 | 0.55 | 6.0 | 0.80 | No | 104.7 | 116.1 | 90.3 |
| Example B5 | FIG. 10 | 5.5 | 10 | 0.55 | 8.0 | 1.07 | No | 105.2 | 104.1 | 90.3 |
| Example B6 | FIG. 10 | 5.5 | 10 | 0.55 | 6.0 | 0.80 | Yes | 108.6 | 118.0 | 90.3 |

(Test C)

In Example C1, a heavy duty tire with the pattern illustrated in FIG. 13 was prepared with specifications shown in Table 3. The following specifications were used in test C. The land portions 4C had specifications: H=7.5 mm; W=10 mm; m/M=1; h=7.5 mm; and h/H=1, the land portions 4M had specifications: H=7.5 mm; W=10 mm; m/M=1; h=7.5 mm; and h/H=1, and the land portions 4S had specifications: H=7.5 mm; W=10 mm; m/M=1; h=7.5 mm; and h/H=1. The wear resistance test (1) of the "running performance evaluation" was carried out for each tire in the same way as described above (test A). However, in test C, wear resistance of each heavy duty pneumatic tire was evaluated using a wear resistance index that was calculated based on wear volume measured after running. Specifically, an index serving as a comparative evaluation was calculated by taking the evaluation result for Example C4 to be 100. A higher index value indicates higher wear resistance. Table 3 shows the results.

TABLE 3

| | | Tire specifications | | | | Tire performance (index) Tire running performance | | |
|---|---|---|---|---|---|---|---|---|
| | | Tread circumferential-direction spacing | Tread circumferential-direction spacing | Tread circumferential-direction spacing | | | | |
| | Drawing | WC (mm) of narrow width-direction grooves 5 in land portions 4C | WM (mm) of narrow width-direction grooves 5 in land portions 4M | WS (mm) of narrow width-direction grooves 5 in land portions 4S | | Wear resistance of land portions 4C | Wear resistance of land portions 4M | Wear resistance of land portions 4S |
| Example C1 | FIG. 13 | 1 | 1 | 1 | | 100 | 100 | 70 |
| Example C2 | FIG. 13 | 1 | 1 | 2 | | 100 | 70 | 100 |
| Example C3 | FIG. 13 | 1 | 2 | 2 | | 100 | 100 | 90 |
| Example C4 | FIG. 13 | 1 | 2 | 4 | | 100 | 100 | 100 |

INDUSTRIAL APPLICABILITY

The heavy duty pneumatic tire of the present disclosure enables a favorable balance of tire wear resistance and tire traction performance.

REFERENCE SIGNS LIST 1 exemplary heavy duty pneumatic tire of present disclosure
100 alternative exemplary heavy duty pneumatic tire
2 tread surface
3 circumferential-direction groove
3c, 3s, 3ss circumferential-direction groove
4, 4C, 4M, 4S land portion
4d partitioned land portion
4p land portion section
5 narrow width-direction groove
40 land portion block
40C, 41C, 42C, 43C, 44C, 40M, 41M, 42M, 43M, 44M, 45M, 40S, 41S, 42S, 43S, 44S, 45S land portion block
40L, 40CL, 40CL1, 40CL2, 40ML, 40ML1, 40ML2, 40SL, 40SL1, 40SL2 land portion block row
40W1c, 40W2c side wall on same side as circumferential-direction groove between land portion block rows
40W1s, 40W2s side wall on opposite side in tread width direction to circumferential-direction groove between land portion block rows
41Ck kicking-out side section of land portion
42Cs stepping-in side section of land portion
θ1c, θ1s inclination angle relative to tread circumferential direction
θ2c, θ2s inclination angle relative to tread circumferential direction
d1 distance between adjacent land portion blocks in tread circumferential direction
d2 distance between adjacent land portion blocks in tread width direction
CL tire equator
P1, P2, P3 land portion position
P2s, P2k land portion position
Ps stepping-in side land portion section
Pk kicking-out side land portion section
H circumferential-direction groove depth
m tread width-direction length of narrow width-direction groove
M tread width-direction width of land portion
TG tread ground contact edge
Tv tread ground contact half-width
W, WC, WM, WS tread circumferential-direction spacing of narrow width-direction grooves
ΔF increase in tread circumferential-direction shear force

The invention claimed is:

1. A heavy duty pneumatic tire comprising
a tire tread surface having, on at least a section thereof, a plurality of circumferential-direction grooves extending along a tread circumferential line and land portions defined either by the circumferential-direction grooves or by the circumferential-direction grooves and tread ground contact edges, wherein
the land portions include at least one partitioned land portion in which a plurality of narrow width-direction sipes extending in a tread width direction are provided,
a prescribed internal pressure is at least 750 kPa,
a depth of the circumferential-direction grooves, represented by H, satisfies a relationship 7 mm≤H≤13 mm,
a tread circumferential-direction spacing of the narrow width-direction sipes, represented by W, satisfies a relationship 5 mm≤W≤20 mm,
the land portions include a first partitioned land portion and a second partitioned land portion located outward in the tread width direction relative to the first partitioned land portion, and
a tread circumferential-direction spacing of narrow width-direction sipes in the second partitioned land portion is greater than a tread circumferential-direction spacing of narrow width-direction sipes in the first partitioned land portion.

2. The heavy duty pneumatic tire of claim 1, wherein
the tread circumferential-direction spacing of the narrow width-direction sipes and the depth of the circumferential-direction grooves satisfy a relationship $0.5 \leq W/H \leq 2.0$.

3. The heavy duty pneumatic tire of claim 1, wherein
a tread width-direction length of the narrow width-direction sipes, represented by m, and a width-direction width of the land portion in which the narrow width-direction sipes are provided, represented by M, satisfy a relationship $m \geq 0.5M$.

4. The heavy duty pneumatic tire of claim 1, wherein
the narrow width-direction sipes each extend in a bent shape in a tire radial direction.

5. The heavy duty pneumatic tire of claim 1, wherein
the land portions further include at least one other partitioned land portion in addition to the first partitioned land portion and the second partitioned land portion, and
among partitioned land portions that are adjacent in the tread width direction, a tread circumferential-direction spacing of narrow width-direction sipes in a partitioned land portion located further outward in the tread width direction is greater than a tread circumferential-direction spacing of narrow width-direction sipes in a partitioned land portion located closer to a tire equator.

6. The heavy duty pneumatic tire of claim 1, wherein
the first partitioned land portion is provided over a range of from 0% to 40% of a tread ground contact half-width from the tire equator as a center.

7. The heavy duty pneumatic tire of claim 1, wherein
the land portions are land portion blocks defined by width direction grooves.

* * * * *